United States Patent
Zerbe et al.

(10) Patent No.: US 9,137,063 B2
(45) Date of Patent: Sep. 15, 2015

(54) HIGH-SPEED SIGNALING SYSTEMS WITH ADAPTABLE PRE-EMPHASIS AND EQUALIZATION

(75) Inventors: Jared L. Zerbe, Woodside, CA (US); Fred F. Chen, Cambridge, MA (US); Andrew Ho, Mountain View, CA (US); Ramin Farjad-Rad, Mountain View, CA (US); John W. Poulton, Chapel Hill, NC (US); Kevin S. Donnelly, Los Altos, CA (US); Brian Leibowitz, San Francisco, CA (US)

(73) Assignee: Rambus Inc., Sunnyvale, CA (US)

( * ) Notice: Subject to any disclaimer, the term of this patent is extended or adjusted under 35 U.S.C. 154(b) by 907 days.

(21) Appl. No.: 11/336,045

(22) Filed: Jan. 20, 2006

(65) Prior Publication Data

US 2006/0188043 A1 Aug. 24, 2006

Related U.S. Application Data

(60) Provisional application No. 60/645,823, filed on Jan. 20, 2005, provisional application No. 60/686,754, filed on Jun. 1, 2005.

(51) Int. Cl.
*H03H 7/30* (2006.01)
*H03H 7/40* (2006.01)
*H03K 5/159* (2006.01)
(Continued)

(52) U.S. Cl.
CPC .............. *H04L 27/01* (2013.01); *H04L 1/0026* (2013.01); *H04L 7/0337* (2013.01); *H04L 25/03057* (2013.01); *H04L 25/03343* (2013.01); *H04L 25/03885* (2013.01); *H04L 25/497* (2013.01); *H04W 52/20* (2013.01); *H04L 7/0025* (2013.01); *H04L 7/0087* (2013.01); *H04L 25/028* (2013.01); *H04L 25/0272* (2013.01);
(Continued)

(58) Field of Classification Search
CPC ................. H04L 1/0026; H04L 2025/03503; H04L 25/0272
USPC ........................ 375/229–233, 259, 295, 316
See application file for complete search history.

(56) References Cited

U.S. PATENT DOCUMENTS

| | | |
|---|---|---|
| 4,187,479 A | 2/1980 | Ishizuka et al. |
| 4,459,698 A | 7/1984 | Yumoto et al. |

(Continued)

FOREIGN PATENT DOCUMENTS

WO  PCT-2005/022750  3/2005

OTHER PUBLICATIONS

Zerbe et al Equalization and Clock Recovery for a 2.5-10-Gb/s 2-PAM/4-PAM Backplane Transceiver Cell, IEEE Journal of Solid-State Circuits, vol. 38, No. 12, Dec. 2003.*

(Continued)

*Primary Examiner* — Freshteh N Aghdam
(74) *Attorney, Agent, or Firm* — Lance Kreisman; Peninsula Patent Group

(57) ABSTRACT

A signaling system includes a pre-emphasizing transmitter and an equalizing receiver coupled to one another via a high-speed signal path. The receiver measures the quality of data conveyed from the transmitter. A controller uses this information and other information to adaptively establish appropriate transmit pre-emphasis and receive equalization settings, e.g. to select the lowest power setting for which the signaling system provides some minimum communication bandwidth without exceeding a desired bit-error rate.

21 Claims, 24 Drawing Sheets

(51) Int. Cl.

| | |
|---|---|
| *H04L 27/01* | (2006.01) |
| *H04L 1/00* | (2006.01) |
| *H04L 7/033* | (2006.01) |
| *H04L 25/03* | (2006.01) |
| *H04L 25/497* | (2006.01) |
| *H04W 52/20* | (2009.01) |
| *H04L 7/00* | (2006.01) |
| *H04L 25/02* | (2006.01) |
| *H04W 52/22* | (2009.01) |

(52) U.S. Cl.
CPC ... *H04L 2025/03503* (2013.01); *H04W 52/225* (2013.01); *Y02B 60/50* (2013.01)

(56) References Cited

U.S. PATENT DOCUMENTS

| | | | |
|---|---|---|---|
| 4,639,681 A | 1/1987 | Hasegawa | |
| 4,985,900 A | 1/1991 | Rhind et al. | |
| 5,097,482 A | 3/1992 | Serizawa et al. | |
| 5,293,405 A | 3/1994 | Gersbach et al. | |
| 5,402,012 A | 3/1995 | Thomas | |
| 5,654,986 A | 8/1997 | Lim | |
| 5,682,112 A | 10/1997 | Fukushima | |
| 5,764,695 A | 6/1998 | Nagaraj et al. | |
| 5,844,431 A | 12/1998 | Chen | |
| 5,991,339 A | 11/1999 | Bazes et al. | |
| 5,999,056 A | 12/1999 | Fong | |
| 6,028,901 A * | 2/2000 | Huynh et al. | 375/350 |
| 6,192,071 B1 | 2/2001 | Hirth et al. | |
| 6,222,592 B1 | 4/2001 | Patel | |
| 6,225,795 B1 | 5/2001 | Stratakos et al. | |
| 6,265,911 B1 | 7/2001 | Nairn | |
| 6,266,379 B1 | 7/2001 | Dally | |
| 6,329,874 B1 | 12/2001 | Ye et al. | |
| 6,429,692 B1 | 8/2002 | Chan et al. | |
| 6,496,911 B1 | 12/2002 | Dixon et al. | |
| 6,542,555 B2 | 4/2003 | Dally | |
| 6,570,916 B1 | 5/2003 | Feldbaumer et al. | |
| 6,624,688 B2 | 9/2003 | Jaussi et al. | |
| 6,680,681 B1 | 1/2004 | Hsu et al. | |
| 6,687,841 B1 | 2/2004 | Marukawa | |
| 6,731,683 B1 | 5/2004 | Fiedler et al. | |
| 6,741,644 B1 * | 5/2004 | Dehghan et al. | 375/229 |
| 6,751,255 B1 * | 6/2004 | Reuven et al. | 375/233 |
| 6,812,872 B1 | 11/2004 | Lu | |
| 6,992,855 B2 | 1/2006 | Ehrlich | |
| 7,030,657 B2 | 4/2006 | Stojanovic et al. | |
| 7,092,472 B2 | 8/2006 | Stojanovic | |
| 7,099,404 B2 | 8/2006 | Dally | |
| 7,126,378 B2 | 10/2006 | Stojanovic et al. | |
| 7,176,721 B2 | 2/2007 | Ho et al. | |
| 7,233,164 B2 | 6/2007 | Stojanovic et al. | |
| 7,286,597 B2 | 10/2007 | Buchwald et al. | |
| 7,397,848 B2 | 7/2008 | Stojanovic et al. | |
| 7,400,675 B2 | 7/2008 | Moughabghab et al. | |
| 7,411,840 B2 | 8/2008 | Gaskins et al. | |
| 7,443,910 B2 * | 10/2008 | Agazzi | 375/219 |
| 7,446,622 B2 | 11/2008 | Chiang | |
| 7,496,161 B2 | 2/2009 | Chou et al. | |
| 7,535,980 B2 * | 5/2009 | Yang et al. | 375/350 |
| 7,715,471 B2 | 5/2010 | Werner et al. | |
| 2001/0024477 A1 * | 9/2001 | Haycock | 375/296 |
| 2001/0055335 A1 | 12/2001 | Agazzi et al. | |
| 2002/0009167 A1 | 1/2002 | Farjad-Rad | |
| 2002/0061012 A1 * | 5/2002 | Thi et al. | 370/352 |
| 2002/0094043 A1 | 7/2002 | Chu et al. | |
| 2003/0035495 A1 * | 2/2003 | Laamanen et al. | 375/296 |
| 2003/0123572 A1 | 7/2003 | Samueli et al. | |
| 2003/0165191 A1 | 9/2003 | Kokuryo et al. | |
| 2003/0223489 A1 | 12/2003 | Smee et al. | |
| 2003/0223505 A1 * | 12/2003 | Verbin et al. | 375/261 |
| 2004/0005001 A1 | 1/2004 | Jones et al. | |
| 2004/0008059 A1 | 1/2004 | Chen et al. | |
| 2004/0022311 A1 * | 2/2004 | Zerbe et al. | 375/229 |
| 2004/0052309 A1 | 3/2004 | Li | |
| 2004/0057513 A1 * | 3/2004 | Schenk | 375/233 |
| 2004/0091028 A1 | 5/2004 | Aronson et al. | |
| 2004/0190661 A1 | 9/2004 | Vrazel | |
| 2004/0203559 A1 | 10/2004 | Stojanovic et al. | |
| 2004/0209635 A1 | 10/2004 | Hsu et al. | |
| 2005/0047500 A1 | 3/2005 | Gupta et al. | |
| 2006/0002462 A1 | 1/2006 | Park | |
| 2006/0008279 A1 * | 1/2006 | Chiang et al. | 398/202 |
| 2006/0093028 A1 * | 5/2006 | Balan et al. | 375/233 |
| 2007/0147559 A1 | 6/2007 | Lapointe | |
| 2008/0048730 A1 | 2/2008 | Bae | |
| 2008/0107165 A1 | 5/2008 | Nicolescu et al. | |
| 2008/0198915 A1 * | 8/2008 | Gorecki | 375/232 |
| 2008/0247452 A1 | 10/2008 | Lee | |
| 2008/0260016 A1 * | 10/2008 | Lapointe et al. | 375/233 |
| 2010/0008414 A1 | 1/2010 | Lee et al. | |
| 2010/0027606 A1 | 2/2010 | Dai et al. | |

OTHER PUBLICATIONS

Roth, Jitter and Cross-talk Effects Using Infiniband Cables and their Implication on Equalization Technologies, Dec. 2002.*
Granberg, Tom, "Handbook of Digital Techniques for High-Speed Design." Prentice Hall Modern Semiconductor Design Series, copyright 2004. Pgs. cover, copyright, 211-226.
Kudoh, Yoshiharu et al., "A 0.13-um CMOS 5-Gb/s 10-m 28AWG Cable Transceiver with No-Feedback-Loop Continuous-Time Post-Equalizer." IEEE Journal of Solid-State Circuits, vol. 38, No. 5 , May 2003. pp. 741-746.
Shakiba, Mohammad Hossein, "A 2.5Gb/s Adaptive Cable Equalizer." ISSCC99/Session 23/Paper WP 23.3. 1999. pp. 396 and 397.
Baker, Alan J., "An Adaptive Cable Equalizer for Serial Digital Video Rates to 400Mb/s." ISSCC96/Session 10/Low-Power & Communication Signal Processing/Paper FA 10.7. pp. 174-175.
Farjad-Rad, Ramin et al., "0.622-8.0Gbps 150m W Serial IO Macrocell with Fully Flexible Preemphasis and Equalization." 2003 Symposium on VLSI Circuits Digest of Technical Papers. 4 pages.
Choi, Jong-Sang et al., "A CMOS 3.5Gbps Continuous-time Adaptive Cable Equalizer with Joint Adaptation Method of Low-Frequency Gain and High-Frequency Boostin." 2003 Symposium on VLSI Circuits Digest of Technical Papers. pp. 103-106.
Dessent, Brian, "Fully Dynamic Logic Blocks Using Multiple-Phase Clocks." EE241, Spring 2001, UC Berkeley. pp. 1-11.
Sirisantana, Naran et al., "A Time Borrowing Selectively Clocked Skewed Logic for High-Performance Circuits in Scaled Technologies." School of Electrical and Computer Engineering, Purdue Univ. 2003. 4 pages.
Ciric, Jovana et al., "Delay Minimization and Technology Mapping of Two-Level Structures and Implementation Using Clock-Delayed Domino Logic." Dept. of Electrical Engineering University of Washington. 2000. 6 pages.
Mahmoodi-Meimand, Hamid, "Diode-Footed Domino: A Leakage-Tolerant High Fan-in Dynamic Circuit Design Style." IEEE Transactions on Circuits and Systems-I: Regular Papers, vol. 51, No. 3, Mar. 2004. pp. 495-503.
Bisdounis, Labros, et al., "European Low-Power Initiative for Electronic System Design." Design CMOS Circuits for Low Power. Copyright 2002, Kluwer Academic Publishers. pp. Cover, Copyright and 71-96.
Landman, Paul, et al., "A Transmit Architecture with 4-Tap Feedforward Equalization for 6.25/12.5Gb/s Serial Backplane Communications." 2005 IEEE International Solid-State Circuits Conference. pp. 66-67 and 585.
Landman, Paul, et al., "A Transmit Architecture with 4-Tap Feedforward Equalization for 6.25/12.5Gb/s Serial Backplane Communications." 2005 IEEE International Solid-State Circuits Conference. pp. 40-41 and 508.
Stojanovic, Vladimir et al., "Adaptive Equalization and Data Recovery in a Dual-Mode (PAM2/4) Serial Link Transceiver." Rambus, Inc., Department of Electrical Engineering, Stanford University. 2004. 4 pages.

(56) References Cited

OTHER PUBLICATIONS

Laakso, Timo I. (Prof.), "Lecture 8—Nonlinear receivers 1: DFE equalizers." S-38.411 Signal Processing in Telecommunications I, Spring 2000, 13 pages.
Laakso, Timo I. (Prof.), "Lecture 4—Optimal Linear Equalizers for Linear Channels 1." S-38.411 Signal Processing in Telecommunications I, Spring 2000, 12 pages.
Laakso, Timo I. (Prof.), "Lecture 5—Optimal Linear Equalizers for Linear Channels 2." S-38.411 Signal Processing in Telecommunications I, Spring 2000, 14 pages.
Laakso, Timo I. (Prof.), "Lecture 6—Adaptive equalizers 1." S-38.411 Signal Processing in Telecommunications I, Spring 2000, 10 pages.
Laakso, Timo I. (Prof.), "Lecture 7—Adaptive equalizers 2." S-38.411 Signal Processing in Telecommunications I, Spring 2000, 12 pages.
Zerbe, Jared L. et al. "Equalization and Clock Recovery for a 2.5-10-Gb/s 2-PAM/4-PAM Backplane Transceiver Cell." IEEE Journal of Solid-State Circuits, vol. 38, No. 12. Dec. 2003. pp. 2121-2130.
Zerbe, Jared, U.S. Appl. No. 13/216,047 filed Aug. 23, 2011, re Office Action dated Dec. 23, 2011. 10 pages.
Zerbe, Jared, U.S. Appl. No. 13/215,951 filed Aug. 23, 2011, Office Action mailed Mar. 2, 2012. 9 pages.
EP Response dated Mar. 21, 2012 to the Official Communication of Aug. 16, 2011 re EP Application No. 11170420.1, includes new claims (highlighted and clear copy) and new description page. 17 pages.
EP Response dated Apr. 3, 2012 re EP Application No. 11170438.3, includes new claims (highlighted and clear copy) and new description pages. 17 pages.
EP Response dated Apr. 13, 2012 re EP Application No. 11170386.4, include new claims (highlighted amendments and clear copy) and new description pages. 16 pages.
EP Response dated Apr. 13, 2012 re EP Application No. 11170426.8, includes new claims (highlighted and clear copy) and new description page. 24 pages.
Zerbe, Jared, U.S. Appl. No. 13/284,002 filed Oct. 28, 2011, Office Action dated Apr. 26, 2012. 12 pages.
PCI-SIG, "PCI Express Base Specification," Revision 1.0, Apr. 29, 2002. 416 pages.
Serial ATA Workgroup, "Serial ATA: High Speed Serialized AT Attachment," Revsion 1.0a, Jan. 7, 2003. 311 pages.
Serial ATA, "Serial ATA II: Electrical Specification," Revision 1.0, May 26, 2004. 187 pages.
EP Response dated May 24, 2013 re EP Application No. 06718942.3 including new claims (highlighted amendments and clear copy) with new description pages. 35 Pages.
EP Office Communication dated Nov. 14, 2012 re EP Application No. 06718942.3. 7 Pages.
EP Response to the Official Communication of Sep. 13, 2011, dated Apr. 2, 2012 in EP Application No. 11 170 405.2. 17 pages.
Chen et al., "A 1.25Gb/s, 460mW CMOS Transceiver for Serial Data Communication," ISSCC97, Session 15, Serial Data Communications, Paper FP 15.3, pp. 242-243, 465, Feb. 7, 1997. 3 pages.
Dally et al., "Transmitter Equalization for 4-Gbps Signaling," IEEE Micro, vol. 17, No. 1, Jan./Feb. 1997, pp. 48-56. 9 pages.
Madduri, Vansanta, "High Speed Backplanes in Communications Systems." Mar. 2004. 7 pages.
Stojanovic, Vladimir et al. "Transmit Pre-Emphasis for High-Speed Time-Division-Multiplexed Serial Link Transceiver." Submitted to IEEE Symposium on VLSI Circuits, Jun. 2004. 17 pages.
Widmer et al., "Single-Chip 4 x 500-MBd CMOS Transceiver," IEEE Journal of Solid-State Circuits, vol. 31, No. 12, Dec. 1996, pp. 2004-2014. 11 pages.
Zhang, Johnny et al. "White Paper on Transmit Pre-Emphasis and Receive Equalization." Oct. 31, 2002. 8 pages.
EP Examination Report dated Dec. 19, 2014 in EP Application No. 11170386.4. 6 pages.
EP Examination Report dated Dec. 19, 2014 in EP Application No. 11170420.1. 7 pages.
EP Examination Report dated Dec. 19, 2014 in EP Application No. 11170426.8. 7 pages.

\* cited by examiner

HIGH-SPEED SIGNALING SYSTEMS WITH ADAPTABLE PRE-EMPHASIS AND EQUALIZATION

CROSS-REFERENCE TO RELATED APPLICATIONS

This application claims priority from U.S. Provisional Applications numbered 60/645,823 and 60/686,754, each of which is incorporated herein by reference.

FIELD OF THE INVENTION

The present invention relates generally to the field of communications, and more particularly to high speed electronic signaling within and between integrated circuit devices.

BACKGROUND

The performance of many digital systems is limited by the interconnection bandwidth within and between integrated circuit devices (ICs). High performance links between ICs suffer from many effects that degrade signals. Primary among them are attenuation (lowering of the pulse-response amplitude), dispersion (broadening of the pulse-response width), and reflections (ripples following the pulse response). In many systems the same link electronics will be used to operate over a variety of different environments, collectively providing high speed performance using an acceptable level of power. There is therefore a need for methods and circuits for balancing the power and performance requirements for links and collections of links.

DETAILED DESCRIPTION

Figure 1:
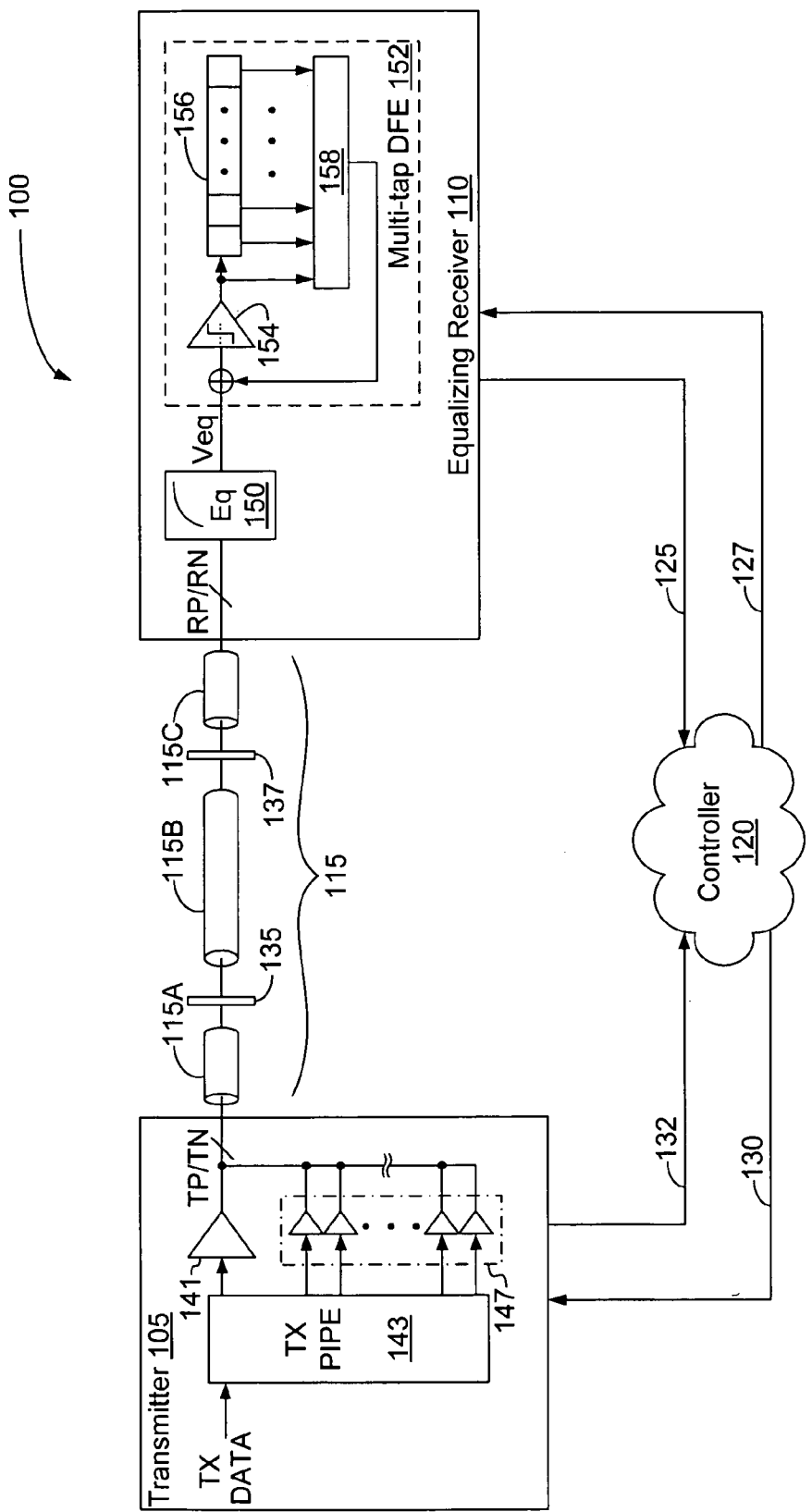
FIG. 1 illustrates a signaling system 100 in accordance with one embodiment.

FIG. 1 illustrates a signaling system 100 in accordance with one embodiment. System 100 includes a pre-emphasizing transmitter 105 and equalizing receiver 110 coupled to one another via a high-speed signal path, or channel, 115, and a controller 120 coupled to transmitter 105 and the receiver 110, typically via relatively low-speed signal paths 125, 127, and 130. In one embodiment, the signal path 115 is formed by component signal paths 115A, 115B and 115C (e.g., transmission lines that introduce respective, nonzero propagation delays and exhibit respective impedance characteristics), each disposed on respective circuit boards that are coupled to one another via circuit board interfaces 135 and 137 (e.g., connectors). In a specific implementation, signal path 115B is formed on a backplane and signal paths 115A and 115C are formed on respective daughterboards (e.g., line cards) that are removably coupled to the backplane via connectors 135 and 137.

Transmitter 105 and receiver 110 may be implemented in respective integrated circuit (IC) devices that are mounted on the daughterboards. Controller 120, which may be a general or special purpose processor, state machine or other logic circuit, may be instantiated with one or both of transmitter 105, receiver 110, or within yet another integrated circuit device or devices. Signal path 125 conveys to controller 120 information expressing a measure of the quality of a digital bit stream transmitted over channel 115. This information may be, for example, the bit error rate (BER), the voltage margin, the data level or another metric of system operating margin. Controller 120 uses this information to find suitable settings for transmitter 105 and receiver 110 and conveys the settings to transmitter 105 and receiver 110 via signals paths 127 and 130. Controller 120 may also consider other information to establish appropriate transmitter and receiver settings, in one embodiment selecting the lowest power setting for which system 100 provides some minimum communication bandwidth over channel 115 without exceeding a specified BER and/or falling below a specified minimum voltage margin. An additional signal path 132 between transmitter 105 and controller 120 can be included to convey measures of swing levels, power, backchannel signal quality, Time Domain Reflectometry (TDR) signatures, etc., that controller 120 might use for analysis and control of link quality.

Transmitter 105 includes an output driver 141 and transmit pre-emphasis circuitry (sometimes referred to as a transmit equalizer) made up of e.g. a transmit pipe 143 and a bank of output drivers or sub-drivers 147. Output driver 141 and sub-drivers 147 function collectively to drive each current symbol onto channel 115. Pre-emphasis signals from sub-drivers 147 combines with the main signal from driver 141 to emphasize signal components that might otherwise be too attenuated by channel 115 for accurate interpretation by receiver 110. Pre-emphasis distorts the transmitted signal to offset the distortion due to the low-pass nature of the associated channel. The desired result is typically an equalized signal at the far end of the channel. The pre-emphasized transmit signal TP/TN may be a binary, differential, AC-coupled voltage signal. Other embodiments may employ signals that are e.g. single-ended, multilevel (more than two levels), DC coupled, or current driven.

Each of sub-drivers 147 is either a pre-tap sub-driver or post-tap sub-driver. If driver 141 has already transmitted the data value at the sub-driver, the sub-driver is a post-tap sub-driver; whereas if driver 141 has yet to transmit the data value at the sub-driver, the sub-driver is a pre-tap driver. Transmit pipe 143 might select, for example, N post-tap drivers and one pre-tap driver. Accordingly, signal TP/TN would have a signal level according to data values having symbol latencies of $-1, 0, 1, 2, \ldots, N$, where the symbol latency of a given data value refers to the number of symbol times by which transmission of the data value lags the transmission of the primary value by driver 141. Different numbers of post-tap and pre-tap drivers may be provided in alternative embodiments, thereby allowing for pre-emphasis based on values having different symbol latencies with respect to the main tap.

Still referring to FIG. 1, receiver 110 may include a linear equalizer 150 and a multi-tap decision-feedback equalizer (DFE) 152. Linear equalizer 150 equalizes the received data signal RP/RN from channel 115 to produce an equalized signal Veq. Equalizer 150 amplifies signal RP/RN using a range of amplification factors, with higher frequencies components typically being treated to higher amplification factors. Channel 115 will typically exhibit a low pass filter effect, in which case equalizer 150 may be used to compensate for attenuation of higher-frequency signal components. In embodiments in which equalizer 150 is adjustable, the degree to which equalizer 150 amplifies e.g. higher frequency signal components relative to lower frequency components can be adjusted by controller 120 or some other means. In some embodiments, equalizer 150 can equalize incoming signals by attenuating some frequency components more than others or by a combination of amplification and attenuation.

DFE 152 includes a sampler 154, a buffer 156, and tap select logic 158. Sampler 154 samples equalized data signals Veq to recover the data symbols expressed as signal TP/TN from transmitter 105, and may support partial-response DFE taps. Buffer 156 stores sequences of the sampled data symbols as post-tap data values. Tap select logic 158 may be included to enable a subset of data values within buffer 156 to be selected to source equalizer taps for receive-side equalization. Because the subset of data values may be selected according to the precise symbol latencies of reflections and other high-latency distortions, a relatively small number of data values may be selected to form receive-side equalization taps having latencies that match the latencies of whatever distortions are evident in the communication link.

The combination of pre-emphasizing transmitter 105, linear equalizer 150, and multi-tap DFE 152 allows the communication link associated with channel 115 to operate in various modes. For highest performance, transmitter 105 may be configured to reduce or eliminate precursor ISI only, linear equalizer 150 may provide channel inversion and gain, and multi-tap DFE 152 may be configured to reduce or eliminate post-cursor ISI. In lower-performance modes that save power, some of the feedback taps of DFE 152 can be shut down and transmitter 105 can be configured to minimize ISI from additional adjacent bits, e.g. the second postcursor and the first precursor, while the linear equalizer may be used to provide gain or channel inversion and gain. Other modes reduce or eliminate power supplied to the PrDFE circuitry in sampler 154 or some taps in transmitter 105. This flexibility allows links to be configured to use the minimum power required to provide an adequate measure of performance by adjusting the amount and type of equalization applied.

Figure 2:
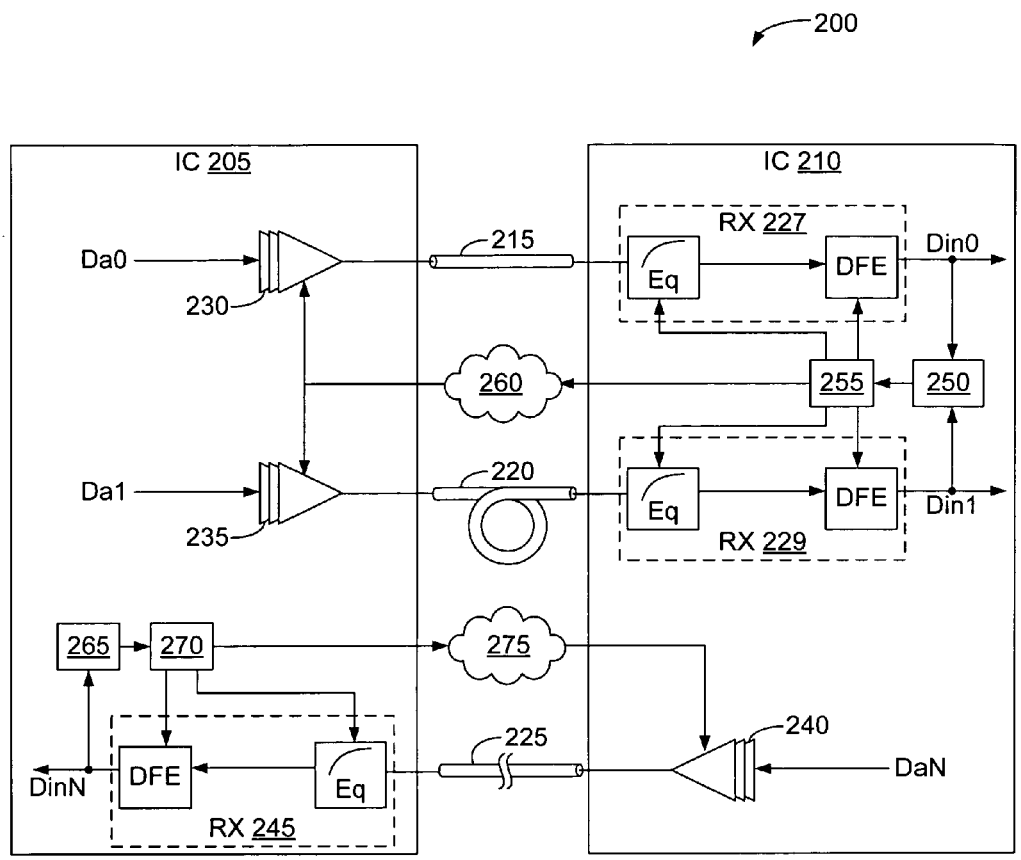
FIG. 2 depicts a multi-channel communication system 200 in accordance with another embodiment.

FIG. 2 depicts a multi-channel communication system 200 in accordance with another embodiment. System 200 includes a pair of integrated circuits (ICs) 205 and 210 that communicate via a number of communication channels 215, 220, and 225. A pair of transmitters 230 and 235 transmits data signals Da0 and Da1 from IC 205 to a respective pair of receivers 227 and 229 on IC 210 via channels 215 and 220, and a transmitter 240 transmits data signal DaN from IC 210 to a corresponding receiver 245 on IC 205 via channel 225. Receivers 227, 229, and 245 may each include a linear equalizer and a DFE, and each of transmitters 230, 235, and 240 may be equipped with pre-emphasis circuitry, as discussed above in connection with FIG. 1.

Each transmitter, linear equalizer, and DFE includes a control port by which the corresponding component can be controlled in a manner that affects power usage and speed performance. In accordance with one embodiment, the characteristics of each adjustable element can be controlled separately or together to achieve a desired tradeoff between power usage and system performance. For example, channel 215 is depicted as a short line to symbolize a short, low-attenuation channel, whereas channel 220 is depicted as including a loop to symbolize a relatively longer, high-attenuation channel. Assuming that the links associated with channels 215 and 220 are expected to achieve the same data rate, it is likely that the link associated with channel 215 could be operated in a more efficient, lower-power mode than the link associated with channel 220.

The links associated with channels 215, 220, and 225 can be optimized independently or together to achieve a desired performance level while minimizing power usage. To this end, IC 210 includes a performance monitor 250 and control circuitry 255. Performance monitor 250 is coupled to output terminals Din0 and Din1 from receiver 227 and 229 to assess the performance of the respective channels, e.g. by calculating the BER. The measurements of channel quality are forwarded to control circuitry 255, which uses this information to adjust, for each associated link, the settings of one or more of the DFE, linear equalizer, and transmitter. A backchannel 260 provides a means of conveying settings from control circuit 255 to transmitters 230 and 235. Backchannel 260 can be a line separate from the channels, or the backchannel information can be conveyed over the channels themselves. The link associated with channel 225 is included to illustrate that links may be included to convey data in either direction. That link includes a second performance monitor 265, second control circuitry 270, and a second backchannel 275. In other embodiments, some or all of performance monitoring and control elements can be combined for use in collections of links. In this manner multi-channel effects such as crosstalk can be traded off vs. independent controls, such as total transmit power through adjustment of bias, tap weights (or other means), or transmit equalization magnitude.

Figure 3:
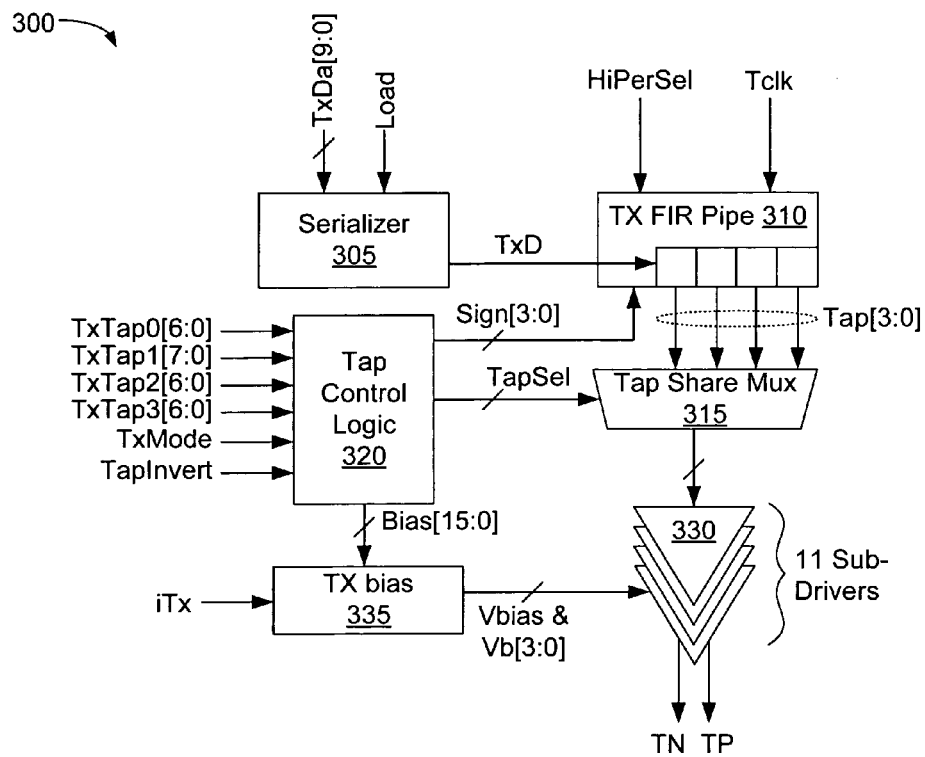
FIG. 3 depicts a transmitter 300, with pre-emphasis, in accordance with one embodiment.

FIG. 3 depicts a transmitter 300, with pre-emphasis, in accordance with one embodiment. Transmitter 300 converts 10-bit parallel data TxDa[9:0] into serial data for transmission as a current-mode signal on differential output nodes TN and TP. Transmitter 300, in coordination with an associated receiver, supports a high-performance mode that optimizes speed performance and a relatively lower-performance mode that sacrifices some performance in favor of improved power efficiency. Reducing the transmit amplitude, and thus the operating power of links that do not require full power to meet performance objectives, reduces supply noise, and consequently allows adjacent links to achieve higher performance. Tap weighting and selection are also configurable, to optimize performance in either power mode. The transmitter settings are adaptive in some embodiments.

Transmitter 300 includes a conventional serializer 305 that periodically loads one ten-bit byte of data TxDa[9:0] upon receipt of a load signal Load. The resulting serialized transmit data TxD is then shifted into four synchronous storage elements within a finite-impulse-response (FIR) pipe 310, synchronized to a transmit clock Tclk. The storage elements are the taps of FIR pipe 310, and their contents are conveyed to a tap-share mux 315 via four lines Tap[3:0]. Four sign signals Sign[3:0] from some tap-control logic 320 determine whether weighting to be applied for each tap is positive (additive) or negative (subtractive). FIR pipe 310 additionally receives a binary performance-select signal HiPerSel that places transmitter 300 in the high-performance mode when asserted (a logic one).

Control logic 320 issues tap-select signals TapSel to mux 315. These select signals partially define the weights afforded the tap values from pipe 310. A driver 330, comprised in this example of eleven sub-drivers, combines the weighted taps from mux 315 to produce output signal TN/TP.

Some bias circuitry 335 generates a bias voltage Vbias from a reference current iTx that maintains constant the strength of driver 330. Bias circuitry 335 generates four additional bias voltages Vb[3:0], each an adjustable fraction of bias voltage Vbias, to fine-tune the weight of the taps selected by mux 315. The values of bias voltages Vb[3:0] are determined by sixteen (4×4) bias control signals Bias[15:0] from control logic 320.

Control logic 320 derives control signals Sign[3:0], TapSel, and Bias[15:0] from four transmit-tap signals TxTap0-3. The manner in which these signals are used is detailed below. Control logic 320 additionally receives a mode signal TxMode that allows the user to select either a normal operational mode or a "null" mode in which transmitter 300 provides constant output currents on nodes TN and TP for calibration. A signal TapInvert inverts the polarity of the transmitter taps, and thus allows transmitter 300 to be used when e.g. the output pads are reversed.

Figure 4:
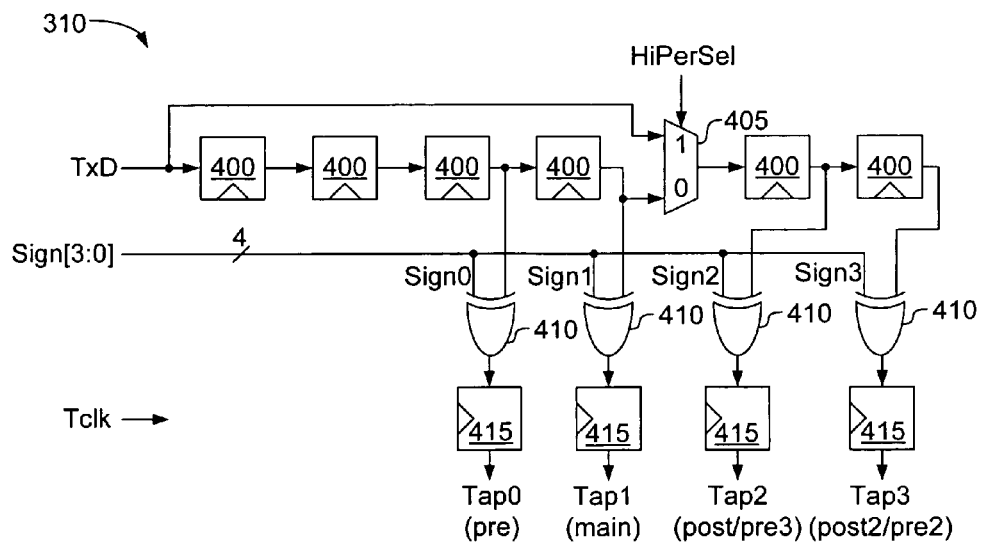
FIG. 4 depicts FIR Pipe 310 of FIG. 3 in accordance with one embodiment.

FIG. 4 depicts FIR Pipe 310 of FIG. 3 in accordance with one embodiment. Pipe 310 includes six sequential storage elements 400 coupled in series to receive transmit data TxD. A multiplexer 405, at the direction of performance-select signal HiPerSel, either connects all of storage elements 400 in series or couples the rightmost two storage elements 400 in parallel with the leftmost two. The contents of the middle two and rightmost two storage elements 400 are selectively inverted by respective XOR gates 410, the outputs of which are conveyed in parallel to four additional storage elements 415. Storage elements 400 and 415 include clock terminals collectively coupled to transmit clock Tclk.

From left to right, the contents of storage elements 415 represent the four taps Tap0-Tap3 from pipe 310. The output of the first tap Tap0 is always the next data symbol (pre tap), the output of the second tap Tap1 is always the main (i.e., the data currently being transmitted). In the high-performance mode (HiPerSel=1), multiplexer 405 bypasses the first four storage elements 400, so that the output of the third tap Tap2 follows the main data by three clock cycles (pre3 tap) and the output of the fourth tap Tap3 follows the main data by two clock cycles (pre2 tap); in the lower-performance mode (HiPerSel=0), multiplexer 405 connects all six storage elements in series, such that the output of the third tap Tap2 precedes the main data by one clock cycle (post tap) and the output of the fourth tap Tap3 precedes the main data by two clock cycles (post2 tap). In this way the actual latency of the main bit is not altered where adjacent transmitter taps are shifted between pre and post-cursor operation. The particular implementation of the FIR pipe 310 is not restrictive; one skilled in the art can easily see there are alternate embodiments which multiplex the equalization taps to different locations to improve overall system margin and power efficiency.

The power modes are not, in this example, to be understood in terms of transmitter 300 in isolation. Transmitter 300 uses essentially the same amount of power in either power mode in this embodiment. The difference in power modes may be viewed from the system perspective. In one lower-power mode in which a multi-tap transmitter is employed with a multi-tap receiver, for example, transmitter 300 reduces the impact of ISI by using one pre-tap and two post-taps while the taps of the receiver are disabled to save power. In a higher-power mode, transmitter 300 is configured to cancel ISI using three pre-taps and the corresponding receiver is enabled to cancel post-tap ISI. Such systems are discussed in more detail below.

Electrical pulses transmitted on a band-limited signaling path disperse in time as they travel from source to destination. In systems in which data is transmitted as a sequence of level-encoded electrical pulses, such time-domain dispersion results in a blending of neighboring pulses, an effect known as dispersion-type inter-symbol interference (ISI). ISI from preceding or following symbols can have additive or subtractive effects on the main data. Sign signals Sign[3:0] from (e.g. tap controller 320 of FIG. 3) and XOR gates 410 are therefore provided to selectively invert the polarity of the symbols stored in elements 400. Selective inversion also allows the polarity of transmitter 300 to be inverted (i.e., output terminals TN and TP become TP and TN, respectively). Turning to the embodiment of FIG. 3, the most-significant bit of each TxTap signal is the sign bit for the corresponding tap, e.g. TxTap0[6]=Sign[0].

Figure 5:
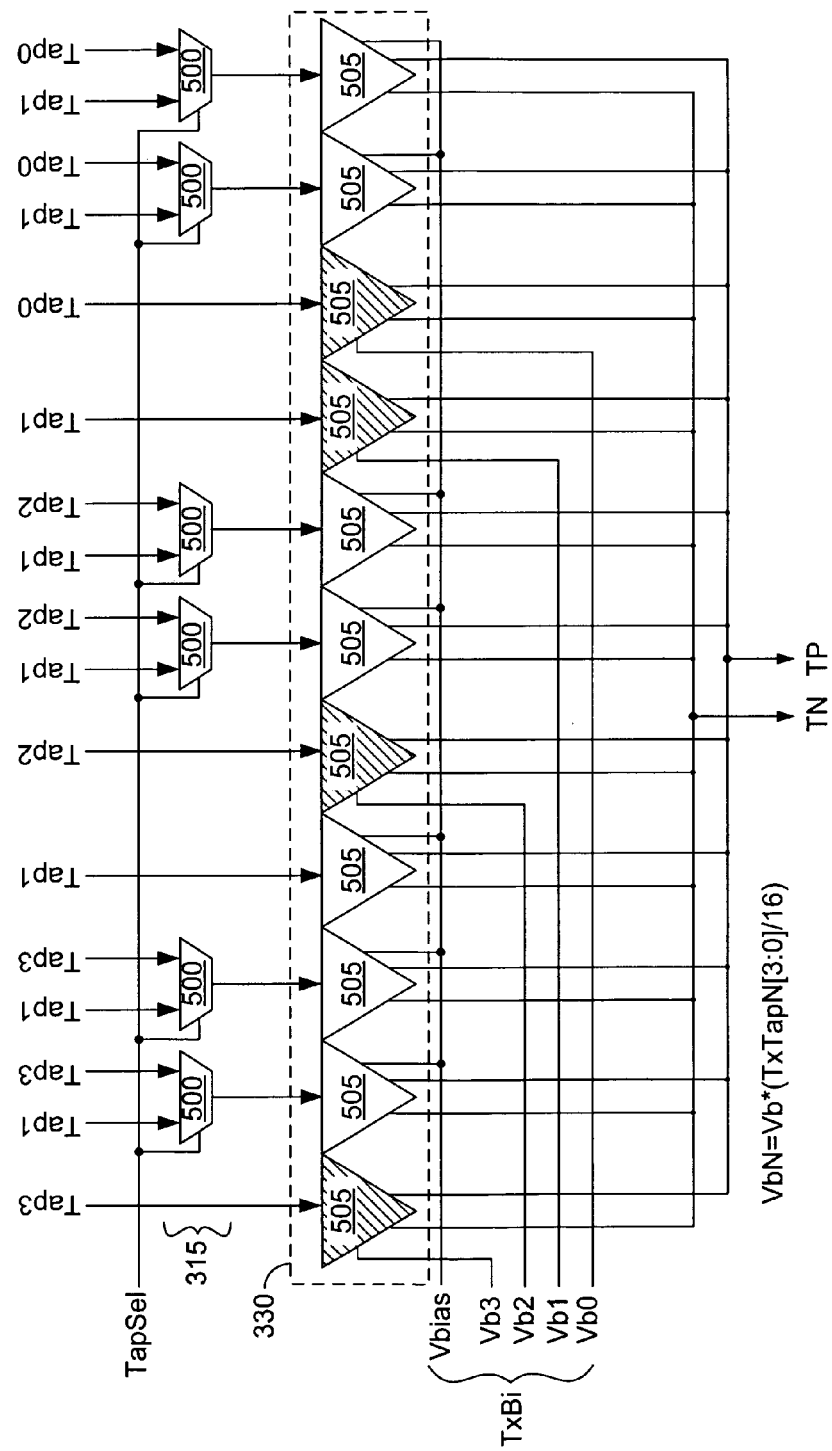
FIG. 5 depicts tap-share mux 315 and driver 330 in accordance with one embodiment.

FIG. 5 depicts tap-share mux 315 and driver 330 in accordance with one embodiment. Mux 315 is divided into six two-input multiplexers 500, each of which has an output terminal connected to an input of one of eleven substantially similar sub-drivers 505 of driver 330 (here and elsewhere, the signals may be single-ended or differential). The differential output terminals of each sub-driver 505 are coupled to transmitter output terminals TP and TN.

The unshaded sub-drivers 505 have fixed output strengths (fixed drive current levels) governed by bias voltage Vbias. In contrast, each of the shaded sub-drivers 505 receives a respective bias voltage Vb# that can be varied to adjust drive strength. In one embodiment, for example, bias voltage Vb3 to the leftmost sub-driver 505 can be adjusted between zero volts and bias voltage Vbias, over sixteen ($2^4$) steps, to produce a range of sixteen drive strengths from zero strength (disabled) to full strength (equal to $15/16$ of the non-shaded sub-drivers in one embodiment). Turning to FIG. 3, the four least-significant bits of each TxTap signal, conveyed to bias circuit 335 as part of signal Bias[15:0], determine the level selected for the corresponding bias voltage, e.g. Vb#=Vb*TxTap#[3:0]/16. In one embodiment, each bias voltage Vb# is the gate voltage of a diode-connected transistor coupled in series with four parallel-coupled, binary-weighted transistors. Combinations of the parallel-coupled transistors can be turned on to vary the drain-source current, and consequently the gate voltage, of the diode-coupled transistor.

Returning to FIG. 5, between tap-select signal TapSel and the variable bias voltages Vb0-Vb3, driver 330 can be configured to provide a broad range of output strengths allocated among the four taps Tap0-Tap3. Each of taps Tap0-Tap3 has associated therewith one of the shaded, adjustable sub-drivers, that can be use in combination with a selectable number of additional full-strength sub-drivers to cover a range of powers. Tap1, the main tap, is expected to be the most powerful, and can be coupled to output nodes TP and TN via as many as eight sub-drivers 505, one adjustable and seven fixed. Muxes 500 can be used to allocate various of sub-drivers 505 to different taps to provide a range of pre-emphasis settings for each tap. Though not shown, sequential storage elements may be included between must 315 and driver 330, and elsewhere, as needed to synchronize output signal TN/TP.

Returning to FIG. 3, control logic 320 decodes the bits 4 and 5 of TxTap0 to control the right-most two multiplexers 500, and thus to control the number of sub-drivers to which signal Tap0 is applied. Tap0 is always applied to the rightmost shaded sub-driver 505, and can be applied to one or both of the rightmost two sub-drivers 505. Bits 4 and 5 of signals TxTap2 and TxTap3 likewise control the application of Taps 2 and 3, respectively. Tap1, the main tap, may be applied to as few as one and as many as eight sub-drivers. The connectivity of Tap1 is controlled by bits 4, 5, and 6 of TxTap 1. In some embodiments the total drive strength remains relatively constant however sub-drivers 505 are configured.

While detailed in connection with specific transmitter architectures, other architectures are readily adapted for used in the communication systems described herein. Suitable transmitters with pre-emphasis are detailed, for example, in U.S. Pat. No. 6,266,379 by William J. Dally; U.S. patent application Ser. No. 10/949,372 entitled "Equalizing Driver Circuit And Method Of Operating Same," by Fred F. Chen; and U.S. patent application Ser. No. 10/261,875 entitled "Equalizing Transceiver with Reduced Parasitic Capacitance," by Fred F. Chen and Vladimir M. Stojanovic.

Figure 6A:
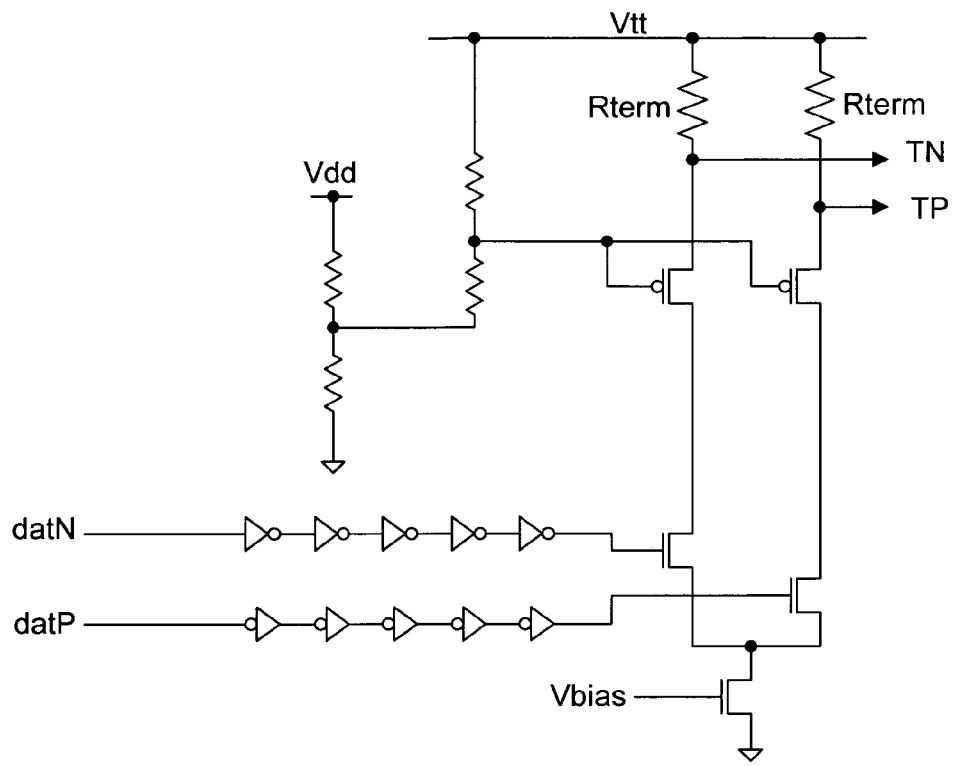
FIG. 6A depicts a sub-driver 505 in accordance with one embodiment.

FIG. 6A depicts a sub-driver 505 in accordance with one embodiment. Sub-driver 505 is a differential cascode driver, the drive strength of which is determined in part by bias voltage Vbias. Other sub-drivers 505 are identical, but receive a variable bias voltage to obtain a range of drive strengths. Signals datN and datP, e.g. differential tap signals Tap0-Tap3, traverse respective inverter chains to the gates of a pair of differential input transistors. The inverters in each inverter chain are sized to provide an appropriately fast fanout for driving the differential transistors. The load of sub-driver 505 includes a pair of cascode-coupled transistors and a corresponding pair of termination elements Rterm. Various types of termination elements may be used.

Figure 6B:
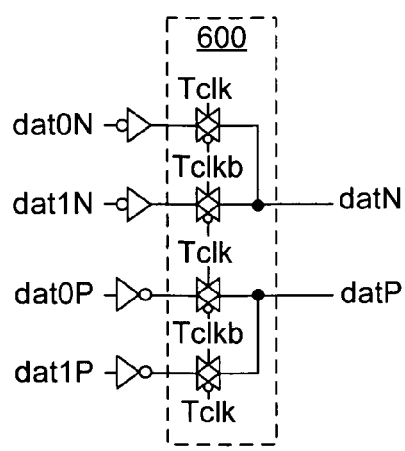
FIG. 6B depicts modified input circuitry for sub-driver 505 of FIGS. 5 and 6A.

Some embodiments employ double-data-rate (DDR) transmitters, which may be architecturally similar to transmitter 300 of FIG. 3, as will be understood by those of skill in the art. In one such embodiment, transmitter 300 of FIG. 3 is modified to include an additional FIR pipe and associated tap-share mux. Serializer 305 can be modified to provide the two FIR pipes with alternate data on alternate clock edges (rising and falling). The input nodes of sub-drivers 505 can then be modified, as depicted in FIG. 6B, to include two pairs of input nodes dat0N/dat0P and dat1N/dat1P. A clock mux 600 then couples the appropriate tap outputs to terminals from the pair of FIR pipes to data terminals datN and datP at the direction of the transmit clock Tclk.

Communication systems in accordance with other embodiments employ different types of pre-emphasizing transmitters. For example, some embodiments may be equipped with RAM-DAC based pre-emphasis filters ("RAM-DAC" is an acronym for "random-access-memory, digital-to-analog converter"). For a detailed discussion of one such transmitter, see U.S. patent application Ser. No. 11/193,916 entitled "RAM-DAC for Transmit Preemphasis," by Andrew Ho, Fred F. Chen, and Jared L. Zerbe, filed Jul. 29, 2005.

Dispersion-type ISI becomes more pronounced at faster signaling rates, ultimately degrading the signal quality to the point at which distinctions between originally transmitted signal levels may be lost or reduced. In addition, many signal channels have impedance discontinuities that lead to signal reflections, which further contribute ISI that also becomes more pronounced at higher signal rates. Some receivers cancel ISI using a decision-feedback equalizer (DFE). DFEs multiply each of N recently received symbols by respective coefficients, the resulting products representing the ISI attributable to the corresponding symbol. Each of these products is added and the resulting sum subtracted from the received signal prior to sampling the next pulse. The ISI associated with the prior data is thereby removed.

In very high-speed systems it can be difficult to resolve the most recent data bit or bits in time to calculate their impact on the incoming symbol. Some receivers therefore ignore the impact of such symbols on the incoming signal, and consequently fail to correct for the ISI attributed to those symbols. Other receivers employ PrDFEs that sample incoming data using multiple correction coefficients, one for each of the possible values of the most recently received symbol or symbols. The correct product or products are then selected after the most recently received symbol or symbols are resolved. PrDFEs are effective, but require a separate computational path for each possible value of the most recently received symbol or, in the case of multiple symbols (multi-symbol PrDFE), a separate computational path for each possible combination of the multiple symbol values. This results in e.g. $2^N$ paths in a binary system that uses N prior symbols. The additional paths occupy area, require power, and slow signal rates by increasing the input capacitance of the receiver. There is therefore a need for power and area-efficient receivers capable of filtering incoming signals based upon the most recently received symbol or symbols. Embodiments detailed below address this need.

Figure 7:
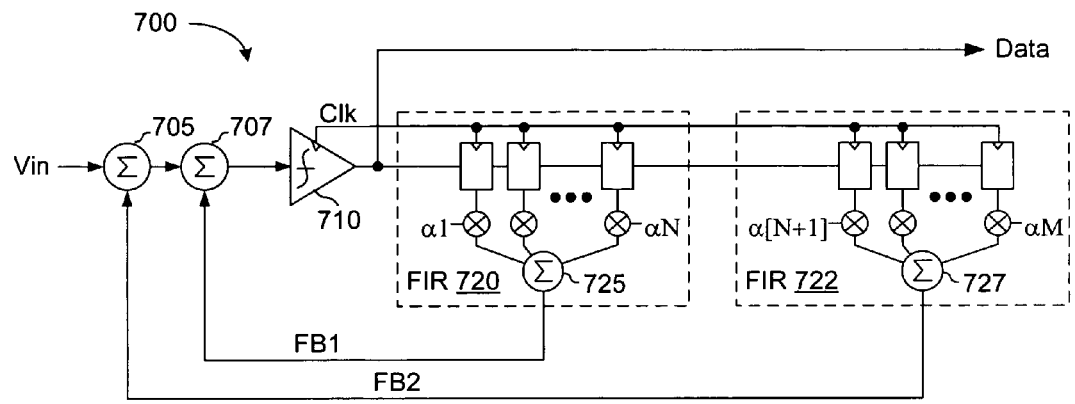
FIG. 7 depicts an embodiment of an area and power-efficient decision-feedback equalizer (DFE) 700.

FIG. 7 depicts an embodiment of an area and power-efficient decision-feedback equalizer (DFE) 700. DFE 700 corrects an input signal Vin for ISI associated with multiple most-recent data bits in accordance with one embodiment. DFE 700 implements an M-tap filter using a series of analog adders 705 and 707, a sampler 710, and two finite impulse response (FIR) filters 720 and 722, each of which may include one or a number of filter taps. Each of N multipliers within FIR 720 multiplies a historical data sample from sampler 710 by a corresponding filter coefficient. An analog adder 725 then sums the products from each tap within FIR 720 and feeds the resulting sum back to adder 707 via a first feedback path FB1. Filter 722 is coupled to the output of sampler 710 via filter 720 in this example, but may be otherwise coupled to the output of the sampler in other embodiments (e.g., via a series of N additional sequential storage elements).

FIR 722 may be operationally similar to FIR 720. Each of one or a plurality of multiplies a historical data sample from FIR 720 by a corresponding one of filter coefficients $\alpha[N+1]$ through $\alpha M$. An analog adder 727 then sums the products from each tap within FIR 722 and feeds the resulting sum back to adder 705 via a second feedback path FB2.

The sample or samples stored within FIR 720 are recent relative to those of FIR 722. As such, DFE 700 therefore has less time to correct for the ISI effects associated with the samples of FIR 720. To address this problem, a relatively fast first feedback path FB1 may be provided from FIR 720 to analog adder 707. A second, relatively slow feedback path FB2 may then be used to apply feedback derived from the older samples of FIR 722.

The second feedback path FB2 may be speed constrained due to e.g. the physical proximity FIR 722 to adder 705 or to delays through amplifiers included in feedback path FB2 or between adder 705 and sampler 710. Dividing the FIR functionality between multiples sets of filter taps allows for the inclusion of feedback path FB1, which can be laid out and tuned for higher speed performance. For example, the faster feedback path FB1 can use shorter wires, apply feedback to different points, or use faster, more power-intensive strategies.

Figure 8:
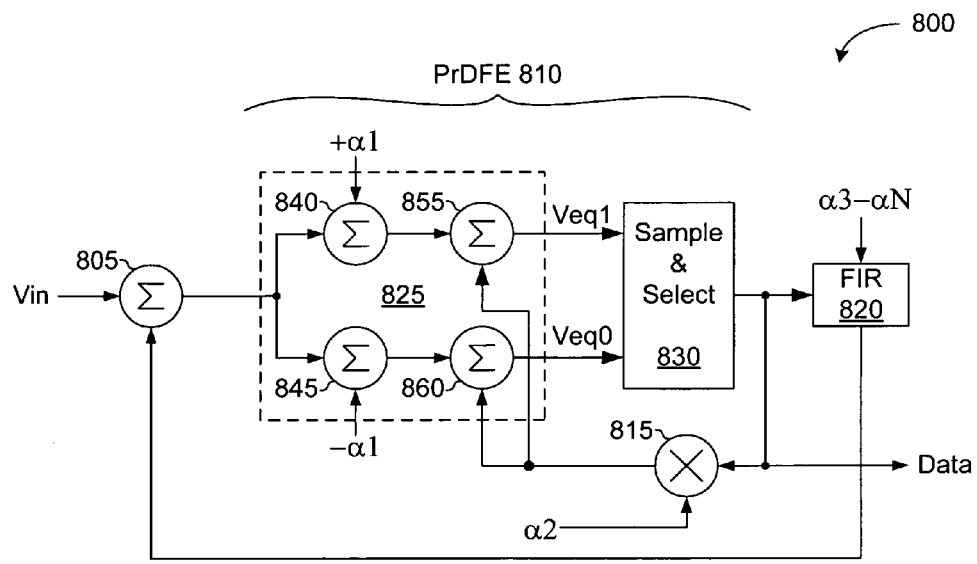
FIG. 8 depicts a DFE 800 in accordance with another embodiment.

FIG. 8 depicts a DFE 800 in accordance with another embodiment. DFE 800 implements an N-tap filter using an analog adder 805, a one-tap PrDFE 810, a split feedback path that includes a multiplier 815, and a finite impulse response (FIR) filter 820. PrDFE 810 includes a correction stage 825 that applies appropriate filter coefficients to generate two equalized signals, a first equalized signal Veq1 for the case in which the preceding symbol represents a logic one and a second equalized signal Veq0 for the case in which the preceding symbol represents a logic zero. Sample-and-select logic 830 samples both equalized signals Veq1 and Veq0 at the appropriate sample instant and then selects the corrected one of the two sampled values once the preceding symbol is resolved. Analog adder 805 adds the output of FIR filter 820 to the incoming signal Vin to compensate for the ISI associated with the third to the Nth preceding symbols. FIR filter 820 may be the same as or similar to FIR filter 720 of FIG. 7, so a detailed discussion of FIR filter 820 is omitted for brevity. The feedback path through multiplier 815 is split to apply correction factor $\alpha 2$ to both feed-forward paths of correction stage 825. Adders 840 and 845 introduce some signal-propagation delay in some embodiments, in which case applying correction factor $\alpha 2$ after adders 840 and 845 speeds the feedback path through multiplier 815 as compared with the feedback from FIR 820. The feedback path from sample-and-select logic 830 can be applied elsewhere in other embodiments.

Correction stage 825 applies first-tap correction factors $+\alpha 1$ and $-\alpha 1$ to the signal from adder 805 via respective adders 840 and 845. Multiplier 815 then applies a second-tap correction factor, the product of the previous sample and correction factor $\alpha 2$, to both of the sums from adders 840 and 845 via a second stage of adders 855 and 860 to produce alternative equalized signals Veq1 and Veq0. Sample-and-select logic 830 then samples both of the alternative signals at the appropriate sample instant and, once the value of the preceding symbol is resolved, conveys the appropriate sampled value to FIR 820 and provides the actual output data.

The first tap of DFE 800 is implemented as a PrDFE because the feedback timing at the worst case process, voltage, and temperature (PVT) condition may exceed the minimum bit period. The feedback tap following PrDFE 810, the second tap in this example, may also be timing critical. In accordance with this embodiment, multiplier 815 multiplies the resolved prior symbol at the output of sample-and-select logic 830 by the second filter coefficient $\alpha 2$. Adders 855 and 860 then add the resulting products to the output voltages from adders 840 and 845. The second-tap feedback path, which includes multiplier 815 and adders 855 and 860, bypasses FIR 820 and PrDFE adders 840 and 845. As a result, the delay through the second-tap feedback path is significantly reduced in comparison to the first tap of FIR 820. FIR 820 supports the remaining taps three to N.

Figure 9:
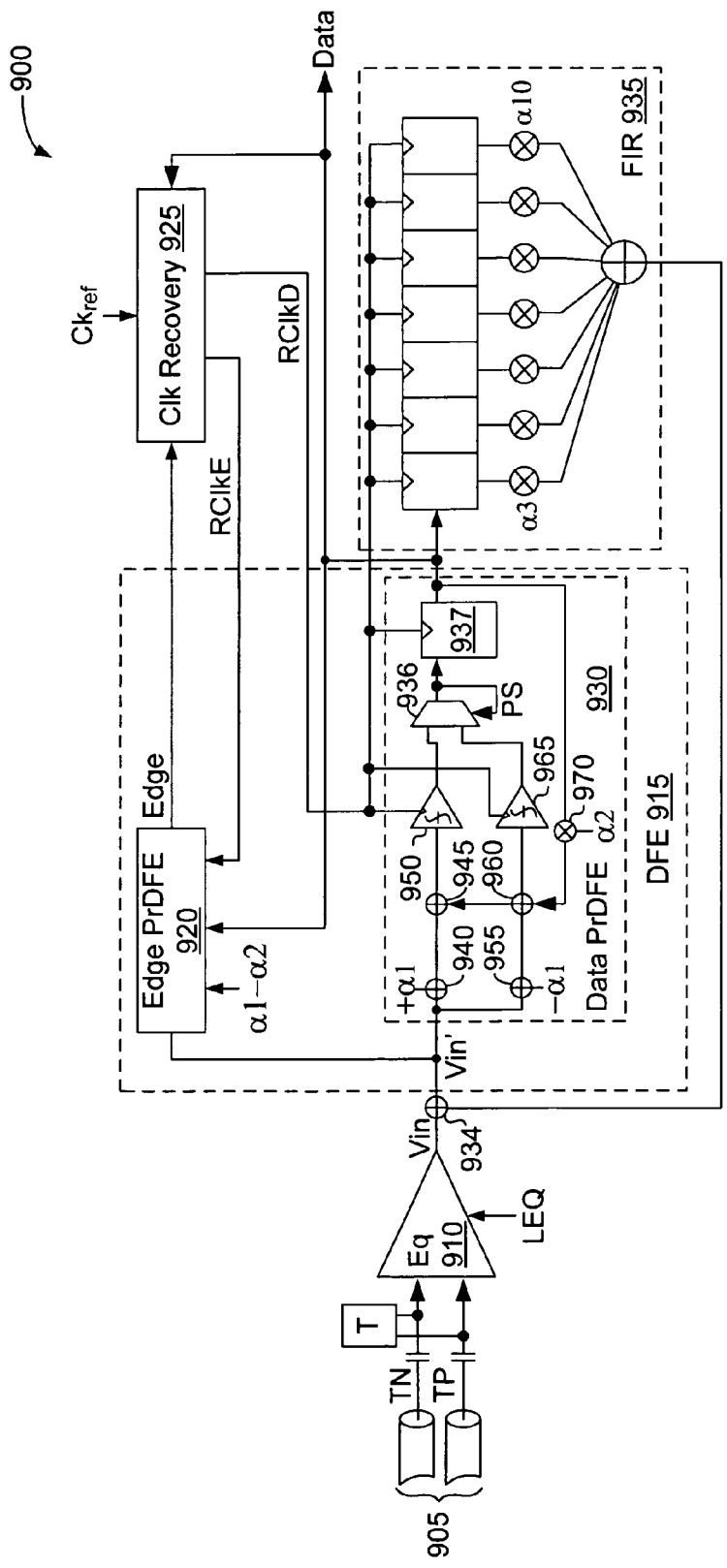
FIG. 9 depicts an embodiment of an area and power-efficient receiver 900 that corrects for ISI associated with multiple most-recent data bits in accordance with another embodiment.

FIG. 9 depicts an embodiment of an area and power-efficient receiver 900 that corrects for ISI associated with multiple most-recent data bits in accordance with another embodiment. Receiver 900 is AC coupled to a corresponding signal channel 905 via a pair of capacitors, but may be DC coupled in other embodiments, and may include one or more termination elements T. Receiver 900 optionally includes an analog continuous-time equalizer 910 with e.g. 16 steps of adjustments controlled by a control signal LEQ. Equalizer 910 amplifies signal RP/RN using a range of amplification factors, with higher frequency components typically being treated to higher amplification factors, to produce an equalized signal Vin. If the associated channel 905 exhibits a low-pass filter effect, then equalizer 910 may compensate for the disproportionate loss of high-frequency signals with a corresponding disproportionate gain. The degree to which equalizer 910 amplifies higher frequency signals relative to lower frequency signals can be adjusted via control signal LEQ. Equalizer 910 can thus be tailored to the characteristics of the associated channel and related components. Equalizer 910 may incorporate a variable-gain amplifier and suitable controls for e.g. gain matching and automatic gain control.

Receiver 900 includes a DFE 915 that in turn includes a pair of partial-response DFE (PrDFE) stages 920 and 930. Of these, PrDFE stage 930 recovers data samples and PrDFE stage 930 recovers edge samples. Conventional clock-recovery circuitry 925 employs the recovered edge and data signals Edge and Data, and a reference clock signal Ckref, to recover a data-sample clock signal RClkD and an edge-sample clock signal RClkE. Clock recovery circuits are well known to those of skill in the art, so a detailed treatment of clock-recovery circuitry 925 is omitted for brevity.

DFE 915 provides two filter taps based upon tap coefficients $\alpha 1$ and $\alpha 2$. Receiver 900 additionally includes, in this embodiment, a finite-impulse response (FIR) filter 935 that provides an additional eight filter taps, based upon tap coefficients α3-α10, to offset signal Vin based upon eight data symbols that precede those associated with tap coefficients α1 and α2. The resulting offset input signal Vin' is downstream from an adder 934 that applies the output from FIR 935 to input signal Vin. In other embodiments, DFE 915, FIR 935, or both may have more or fewer taps. It is also possible that PrDFEs 920 and 930 have different numbers of taps, or that the respective taps be based upon different prior symbols.

The first tap of PrDFE stage 930 is implemented as a partial-response ISI canceller because the worst-case feedback timing may exceed the minimum bit period, which is 156 ps (6.4 Gbps) in one embodiment. The second feedback tap may also be timing critical, and is integrated as part of PrDFE 930 in this example. FIR filter 935 directly applies the remaining eight taps to the input of PrDFE 930, by current summing in one embodiment. The timing of the 3rd tap (the first tap in filter 935) may also be critical at the worst case PVT corner, so that path should be considered carefully. A supply regulator or dedicated supply voltages, neither of which is shown, may be included where components of receiver 900 require supply voltages above the internal supply voltage Vdd to achieve a desired degree of linearity.

Filter 935 cancels the tap3 to tap 10 ISI values at the input to DFE 915, so the input Vin' to DFE 915 will ideally have the following form:

$$Vin'=rx(t)=\beta(tx(t)+\alpha 1 tx(t-1)+\alpha 2 tx(t-2)) \quad (1)$$

where tx(t) is the transmitted symbol, β is the DC attenuation of channel 905 and equalizer 910, α1 and α2 are the ISI effects through channel 905 and equalizer 910 for first and second taps. PrDFE 930 implements the corrections for the last two terms of equation (1), the two most timing critical DFE tap corrections. Coefficients α1 and α2 of equation (1) represent the ISI effects through the channel, and are not to be confused with the like-identified tap values, or correction factors, used to counteract these effects. The magnitudes of the correction factors are selected to equal or approximate the ISI effects. In some embodiments the correction factors are added to the threshold level against which the incoming data is measured. In other embodiments, the correction factors are subtracted from the incoming data. Methods and circuits for deriving appropriate correction factors are detailed below.

PrDFE stage 930 implements the first tap using a feed-forward and select method. To accomplish this, PrDFE 930 includes two forward paths, one for each of the two possible symbol types (logic one and logic zero) in this binary system. With insufficient time to resolve the previous symbol before applying the appropriate correction to the incoming symbol, the first forward path applies the appropriate first-tap correction factor (coefficient α1) assuming the previous symbol PS was a logic one, while the second forward path applies the appropriate first-tap correction factor (coefficient -α1) assuming the previous symbol PS was a logic zero. A pair of samplers 950 and 965 then samples each of the resulting two corrected signals. Finally, some sample-select logic, in this case a multiplexer 936, passes one of the samples from samplers 950 and 965 to a storage element 937 based upon the resolution of the previous symbol PS. Only two forward paths are used in this embodiment, but other embodiments, such as those receiving multiple-amplitude (multi-PAM) signals or those using multiple stages of PrDFE to resolve more than one previous symbol, may include additional forward paths.

In the first forward path of PrDFE stage 930, a series of analog adders 940 and 945 precede sampler 950. Likewise, in the second forward path, a series of analog adders 955 and 960 precede sampler 965. Adders 940 and 955 may be implemented as gain stages and/or wire-or summers. A feedback path from storage element 937 and common to both forward paths includes a coefficient multiplier 970 coupled between the output of PrDFE stage 930 and each of adders 945 and 960. In other embodiments the output from storage element 937 extends to two coefficient multipliers, one for each of adders 950 and 960.

As noted above, the first forward path applies the appropriate correction (+α1) assuming the previous symbol was a logic one, while the second applies the appropriate correction (-α1) assuming the previous symbol was a logic zero. Multiplexer 936 then excludes the erroneous sample when the preceding symbol PS is resolved. (Methods of making preceding symbols available to PrDFE stages in double-data-rate embodiments are explained below in connection with FIGS. 12-15.) The feedback path that includes multiplier 970 is applied to both forward paths to compensate the incoming symbol for ISI associated with the symbol PPS just prior to the prior symbol, which is available at the output of PrDFE 930. The product of the data sample from storage element 937 and second-tap coefficient α2 is applied to an addend input of each of adders 945 and 960. Adders 945 and 960 may be implemented as e.g. gain stages and/or wire-or summers. The feedback path from storage element 937 to adders 945 and 960 allows the second tap to bypass FIR 935, and consequently to expedite application of the second-tap correction factor. The second tap equalization can therefore be applied faster than the first tap of FIR 935.

The delay between the output of PrDFE stage 930 and the input terminals of samplers 950 and 965 should be, in this embodiment, less than one symbol time as required to meet the set-up time of samplers 950 and 965. Extensions to quad data rate (QDR) or other rate schemes simply extend the parallelism to reduce clock frequency and can be easily understood by someone skilled in the art. Filter 935 includes a series of sequential storage elements, the contents of which are weighted by corresponding tap coefficients α3-α10 and added to the input of PrDFE stage 930.

Edge PrDFE stage 920 is similar to Data PrDFE stage 930, but the clock signal RClkE used by PrDFE stage 920 is timed to sample edges of the incoming data. The sampled edges Edge and sampled data Data are conveyed to clock-recovery circuitry 925, which uses the edge and data samples to synchronize sample clocks RClkD and RClkE to the incoming data from channel 905. The resulting recovered clock signals RClkD and RClkE are then used to time Data PrDFE stage 930 and Edge PrDFE stage 920, respectively. Clock recovery based on sample edges is well known, so a detailed discussion of clock-recovery circuitry 925 is omitted for brevity. Other embodiments may not capture timing information from incoming data signals, and may thus dispense with edge samplers and clock-recovery circuitry.

Figure 10:
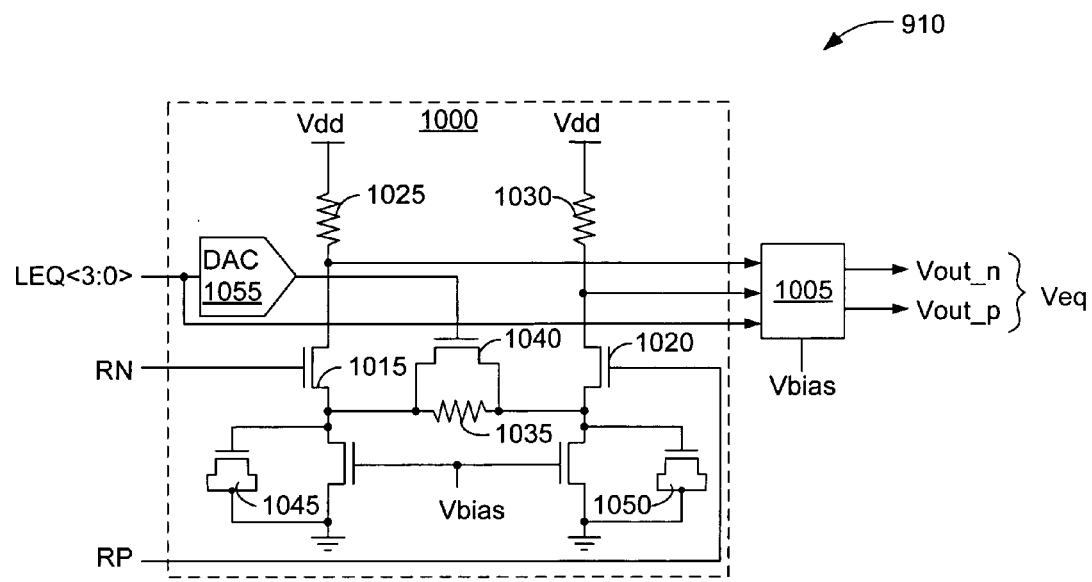
FIG. 10 schematically depicts equalizer 910 of FIG. 9 in accordance with one embodiment.

FIG. 10 schematically depicts equalizer 910 of FIG. 9 in accordance with one embodiment. Equalizer 910 includes two nearly identical stages 1000 and 1005, the second of which is depicted as a black box for ease of illustration. Other embodiments include more or fewer stages. Equalizer stage 1000 includes a pair of differential input transistors 1015 and 1020 with respective loads 1025 and 1030. Source degeneration is provided by a resistor 1035, a transistor 1040, and a pair of capacitor-coupled transistors 1045 and 1050. The capacitance provided by transistors 1045 and 1050 is in parallel with resistor 1035 and transistor 1040, so the net impedance between the sources of transistors 1015 and 1020 decreases with frequency. As a consequence, the gain of equalizer stage 1000 increases with frequency. The resistance through transistor 1040 can be adjusted to change the source-degeneration resistance, and thus to alter the extent to which the gain of equalizer stage 1000 increases with frequency.

In an alternative embodiment, source degeneration is provided by one or more floating metal-insulator-metal (MIM) capacitors connected in parallel with resistor 1035. The MIM capacitors can be used instead of or in addition to capacitors 1045 and 1050. Other control mechanisms might also be used to alter the source-degeneration resistance, as by digitally switching in different sizes and combinations of resistors and capacitors.

A DAC 1055 converts the digital equalization setting Eq[5:0] from e.g. controller 120 of FIG. 1 to a gate voltage for transistor 1040. The value of the equalization setting thus determines the resistance between the drains of transistors 1015 and 1020, and consequently the shape of the gain curve of equalizer stage 1000. In general, the higher the resistance between the sources of transistors 1015 and 1020, the more extreme the gain curve of stage 1000 over the frequency range of interest. In one embodiment, the output voltage from DAC 1055 decreases as setting Eq[5:0] increases from 000000 to 100000, remaining constant for higher counts. These maximum counts represent the highest resistance between the sources of transistors 1015 and 1020, and consequently the maximum equalization for stage 1000. The output voltage from a similar DAC (not shown) in stage 1005 remains high for counts up to 100000, decreasing count-by-count for higher values. Thus, the lowest equalization setting (Eq[5:0]=000000) represents the lowest source-degeneration resistance for both stages 1000 and 1005, while the highest equalization setting (Eq[5:0]=111111) represents the highest.

Figure 11:
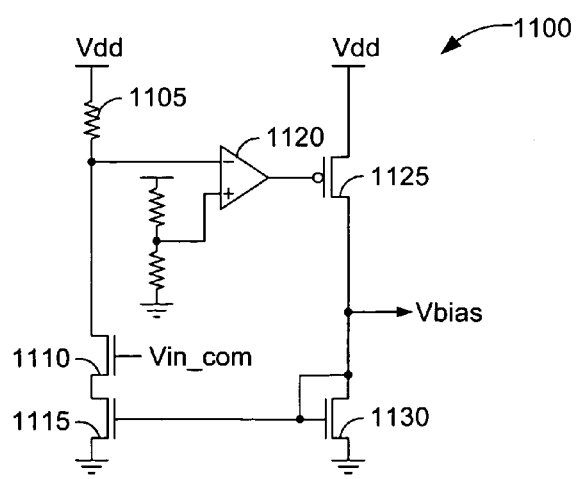
FIG. 11 schematically depicts a bias-voltage generator 1100 for use with equalizer 910 FIG. 10.

FIG. 11 schematically depicts a bias-voltage generator 1100 for use with equalizer 910 of FIGS. 9 and 10. A resistor 1105 and transistors 1110 and 1115 form a half-circuit replica of equalizer stage 1000, with the input common-mode voltage Vin_com applied to the gate of transistor 1110. A feedback loop including an amplifier 1120 and a pair of transistors 1125 and 1130 sets the voltage on the inverting (−) terminal of amplifier 1120 equal to the voltage applied to the non-inverting (+) terminal. In an embodiment in which supply voltage Vdd is 1.2 volts, a resistor divider provides one volt to the non-inverting terminal of amplifier 1120. The resulting bias voltage Vbias to stages 1000 and 1005 establishes a one volt common-mode voltage for those stages. In some embodiments, lower common-mode voltages are avoided to ensure that transistors 1015 and 1020 of FIG. 10 are always in saturation. The half circuit of FIG. 11 can be scaled down, by a factor of eight in one example, to save power.

Figure 12:
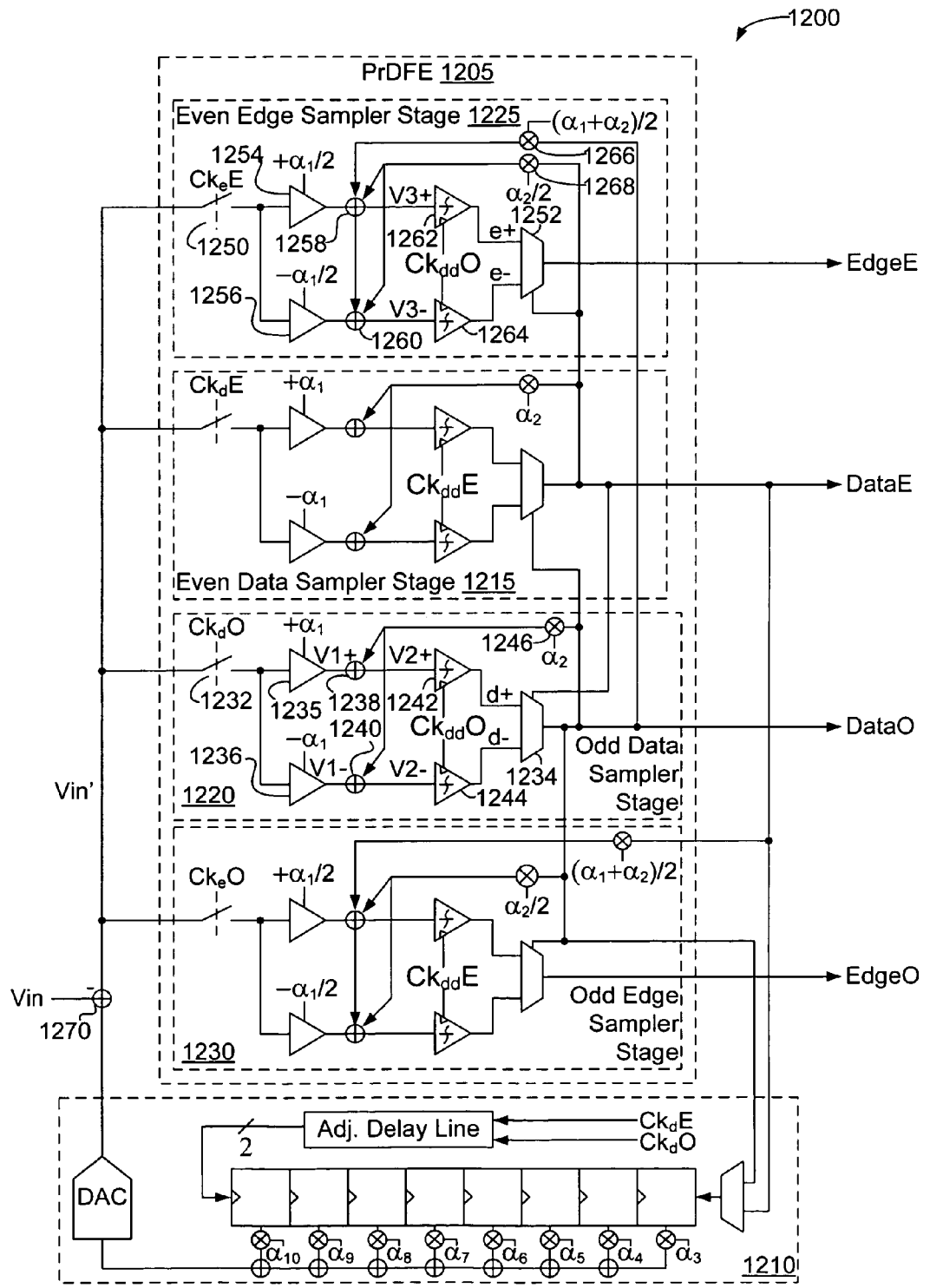
FIG. 12 depicts a receiver 1200 in accordance with one double data rate (DDR) embodiment that recovers timing information from the incoming data.

FIG. 12 depicts a receiver 1200 in accordance with one double data rate (DDR) embodiment that recovers timing information from the incoming data. Receiver 1200 includes a PrDFE 1205 and an FIR 1210. PrDFE 1205 separately captures even data DataE and odd data DataO using respective Even and Odd data-sampler stages 1215 and 1220, and separately captures even edges EdgeE and odd edges EdgeO using respective Even and Odd edge sampler stages 1225 and 1230.

The operation of data sampler 1220 and edge sampler stage 1225 are detailed below in connection with FIGS. 13A and 13B: the operation of the remaining samplers is similar, and so is omitted for brevity. PrDFE 1205 compensates for the ISI associated with the two most recently received symbols; FIR 1210 compensates input signal Vin for the ISI associated with eight additional symbols resolved before the most recent two.

Odd data sampler stage 1220 includes sampling switch 1232 controlled by an odd-data clock $Ck_dO$ (for "clock-data-odd") and two feed-forward paths to some sample-select logic, a multiplexer 1234 in this example. Sampling switch 1232 may be realized by any number of suitable methods well known by those versed in the art of sample-and-hold design. Sampling switch 1232 allows more time for feedback to settle, and is omitted in other embodiments. Each feed-forward path includes, in this embodiment, a respective "twist" amplifier 1235/1236, an analog adder 1238/1240, and a sampler 1242/1244. A coefficient multiplier 1246 common to both feed-forward paths is disposed between the output of multiplexer 1234 and each of adders 1238 and 1240. In this DDR embodiment, the timing requirements for the feedback path used to implement the second tap are relaxed because the incoming data is divided into two paths, odd and even, each operating at half the rate of the incoming data.

Sampling switch 1232 samples input signal Vin' on the rising edges of clock signal CkdO; the sampled voltage is held between clock edges. Summing twist amplifiers 1235 and 1236 sum the input signal with a reference (voltage or current) that can be adjusted, or "twisted," to change the way the input signal is interpreted. Tap coefficient $\alpha 1$ is applied to the reference terminal of amplifier 1235, where $\alpha 1$ is the appropriate correction factor if the preceding data symbol was a logic one; tap coefficient $-\alpha 1$ is applied to the reference terminal of amplifier 1236, where $-\alpha 1$ is the appropriate correction factor if the preceding data symbol was a logic zero. The resulting corrected signals V1+ and V1− are presented to respective adders 1238 and 1240.

Multiplier 1246 multiplies the preceding data symbol on the output of multiplexer 1234 by coefficient $\alpha 2$: adders 1238 and 1240 add the resulting product to each of voltages V1+ and V1− to produce corrected signals V2+ and V2−. Samplers 1242 and 1244 then sample both of analog signals V2+ and V2− on a rising edge of a delayed data clock signal $Ck_{dd}O$ delayed sufficiently from clock signal CkdO to allow the feedback from multiplier 1246 to adjust the voltage on nodes V2+ and V2−. In other embodiments, the clock used to time samplers 1242 and 1244 has a different fixed or variable phase relationship with respect to clock signal CkdO.

Samplers 1242 and 1244 sample the equalized signals V2+ and V2− to produce logic signals d+ and d− on the input nodes of multiplexer 1234. Multiplexer 1234 then selects one of signals d+ and d− based upon the immediately preceding symbol as resolved by even data sampler stage 1215. If the immediately preceding data symbol was a logic one, then multiplexer 1234 selects signal d+; conversely, if the immediately preceding data symbol was a logic zero, then multiplexer 1234 selects signal d−.

Figure 13A:
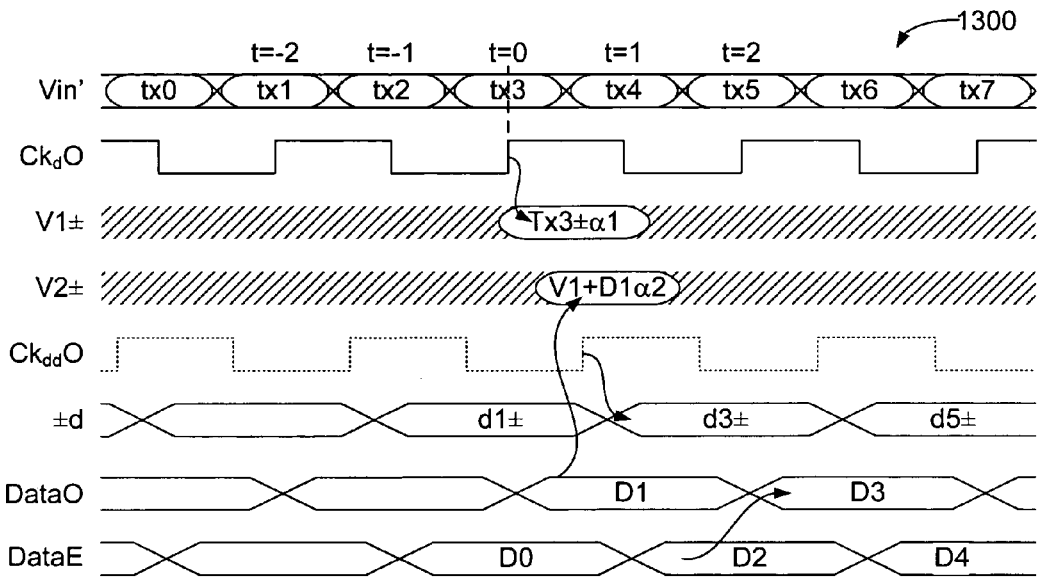
FIG. 13A is a waveform diagram 1300 depicting the operation of odd data sampler 1220 of FIG. 12.

FIG. 13A is a waveform diagram 1300 depicting the operation of odd data sampler 1220 of FIG. 12. Input signal Vin' is represented as a series of data symbols tx0-tx7, the timing of which is measured with respect to time t=0, the sample time of interest. In general, data sampler 1220 resolves a given data symbol only after the two preceding symbols are resolved. In the example of FIG. 13A, symbol tx3, sampled at time t=0, is resolved as odd data D3 after the immediately preceding symbols tx2 and tx1 are resolved as data symbols D2 and D1, respectively.

First, at time t=0, sample switch 1232 samples the voltage on line Vin'. Summing twist amplifier 1235 adds the sampled voltage to correction factor $\alpha_1$ to provide a first intermediate voltage V1+. Intermediate voltage V1+ is the symbol tx3 corrected for the ISI associated with symbol tx2, assuming symbol tx2 is representative of a logic one. The corresponding intermediate voltage V1− in the second feed-forward path is the symbol tx3 corrected for the ISI associated with symbol tx2, assuming symbol tx2 is representative of a logic zero. Next, adders 1238 and 1240 add to respective voltages V1+ and V1− the product of correction factor $\alpha 2$ and the resolved prior odd data symbol D1 from the output from multiplexer 1234. Alternatively, this same function can also be realized with summing twist amplifiers as well.

Voltages V2+ and V2− to respective samplers 1242 and 1244 represent two interpretations of symbol tx3. Voltage V2+ is corrected for the two preceding data symbols based upon the assumption that the immediately preceding data symbol D2 represented a logic one, while voltage V2− was similarly corrected based upon the assumption that the immediately preceding data symbol was a logic zero. Samplers 1242 and 1244 respectively sample voltages V2+ and V2− on the next rising edge of odd data clock $Ck_{dd}O$, a slightly delayed version of odd data clock $Ck_dO$. Outputs d+ and d− are logic signals, only one of which is a sampling of the properly corrected symbol.

The input terminals of multiplexer 1234 are respectively coupled to the output terminals of samplers 1242 and 1244. Multiplexer 1234 can thus select from signals d+ and d−. The select terminal of multiplexer 1234 is coupled to the output terminal of even data sampler stage 1215, which resolves the even data symbols immediately preceding each odd data symbol. Multiplexer 1234 thus selects the correct one of samples d+ and d− as soon as symbol D2 is resolved. Sampler stage 1220 thus produces data D3 when both samples d+ and d− are settled and even stage 1215 has resolved data sample D2. Even data stage 1215 operates in the same fashion as odd data stage 1220, except that the data sample immediately preceding each even data symbol is provided by odd data stage 1220, and the data sample immediately preceding the odd data sample is provided by the output of even data stage 1215.

Even edge sampler stage 1225, the topmost stage in FIG. 12, includes a sampling switch 1250 controlled by an even-edge clock $Ck_eE$ (for "clock-edge-even"), and two feed-forward paths to a multiplexer 1252. Each feed-forward path includes a respective summing "twist" amplifier 1254/1256, an adder 1258/1260, and a sampler 1262/1264. A pair of coefficient multipliers 1266 and 1268 common to both feed-forward paths are disposed between the respective outputs of odd and even data samplers 1220 and 1215 and each of adders 1258 and 1260. As explained below, the feedback provided to adders 1258 and 1260 is based upon an assumption that the ISI associated with a given edge will be an average of the ISI associated with the two symbols adjacent the edge. This feedback is therefore based upon even and odd data samples from stages 1215 and 1220.

Figure 13B:
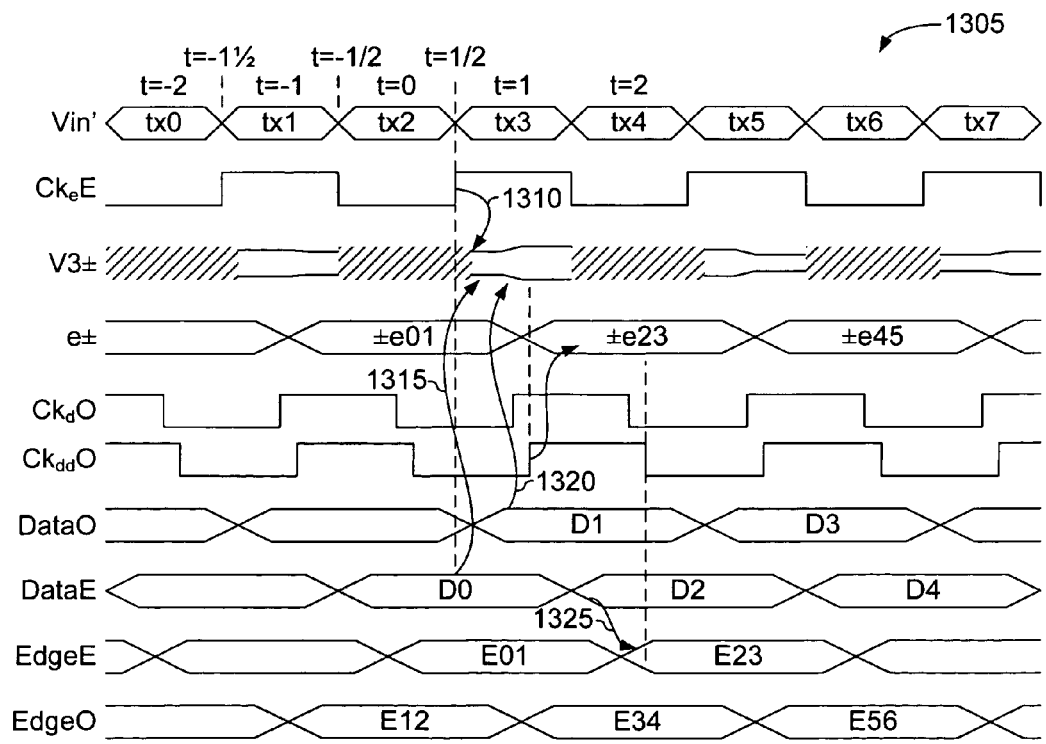
FIG. 13B is a waveform diagram 1305 depicting the operation of even edge sampler stage 1225 of FIG. 12.

FIG. 13B is a waveform diagram 1305 depicting the operation of even edge sampler stage 1225 of FIG. 12. As in FIG. 13A, input signal Vin' is represented as a series of data symbols tx0-tx7, the timing of which is measured with respect to time t=0. Edge sampler stage 1225 samples symbol edges to recover information about the timing of signal Vin', however, so the sample instants occur at the symbol boundaries (e.g., t=½). The following discussion details the resolution of the sample value E23, which is a sample of the edge that occurs between symbols tx2 and tx3 at time t=½.

Sampler stage 1225 compensates for ISI resulting from two prior edge samples, those that occur at times t=−½ and t=−1½. An assumption is made that the ISI associated with a given edge will be an average of the ISI associated with the two adjacent symbols. Thus, for example, the ISI associated with the sample edge at t=−½ is assumed to be the average of the ISI induced by symbols tx1 and tx2, and the ISI associated with the sample edge at t=−1½ is assumed to be the average of the ISI induced by symbols tx0 and tx1. Calculating the edge voltage Ve thus requires the resolution of three prior data symbols, one more than was needed to resolve data in the example of FIG. 13A. Also important, because edge sampler stage 1225 occurs only half of a symbol period from the most recent data sample, edge sampler stage 1225 has less time to resolve the immediately preceding data symbol than does sampler 1220.

Sampling switch 1250 samples input signal Vin' on the rising edges of clock signal $Ck_eE$; the sampled voltage is held between samples using standard techniques. Summing twist amplifiers 1254 and 1256 compare the sampled input signal with a reference (voltage or current) that can be adjusted to change the way the input signal is interpreted. Tap coefficient $\alpha_1/2$ is applied to the reference terminal of amplifier 1254, where $\alpha_1/2$ is the appropriate correction factor if the preceding data symbol tx2 was a logic one; tap coefficient $-\alpha_1/2$ is applied to the reference terminal of amplifier 1236, where $-\alpha_1/2$ is the appropriate correction factor if the preceding data symbol tx2 was a logic zero. The resulting pair of corrected signals is then presented to respective adders 1258 and 1260.

Multiplier 1266 multiplies odd data D1 from sampler 1220 by half the sum of coefficients $\alpha_1$ and $\alpha_2$, and multiplier 1268 multiplies even data D0 from sampler 1215 by half of coefficient $\alpha_2$. Voltages V3+ and V3− at the inputs of respective samplers 1262 and 1264 are thus corrected for the ISI attributable to symbols D0 and D1 before the next rising edge of delayed odd-data clock $Ck_{dd}O$. Samplers 1262 and 1264 output edge samples e+ and e−, one of which is a sample of the appropriately corrected edge sample. Multiplexer 1252 selects the correct one of edge samples e+ and e− based upon the resolution of prior sample D2 when that symbol is available from sampler 1215.

Turning to FIG. 13B, the following describes the resolution of edge data E23, which takes place at time t=½, taking into account the ISI from symbols tx0, tx1, and tx2. Data D0 is resolved as of the sample instant t=½, so signals V3+ and V3− (collectively V3±) are promptly corrected for the ISI associated with D0 (arrows 1310 and 1315). Prior to this correction, voltages V3± are shaded to identify those portions of the signals as invalid. The next prior symbol resolved, data D1, becomes available while data D0 is still valid. Multiplier 1266 (FIG. 12) therefore provides the appropriate product to adders 1258 and 1260 before the rising edge of clock signal $Ck_{dd}O$ (arrow 1320). The voltages sampled by samplers 1262 and 1264 are therefore correctly compensated for the ISI produced by data D0 and D1. The captured logic levels are represented in FIG. 13B as two symbols ±e23, one sample for each of the two data values for the preceding data sample D2. Finally, when sample D2 is resolved, multiplexer 1252 transmits the correct one of the two corrected edge samples as sample edge E23 (arrow 1325).

The foregoing discussion details how receiver 1200 treats the incoming signal to cancel the ISI associated with the two most recently received data bits. FIR 1210 conventionally calculates the ISI for eight additional bits and subtracts the resulting value from input terminal Vin. Briefly, FIR 1210 stores eight resolved data symbols, four odd and four even, in a shift register. In one embodiment a digital multiplier associated with each bit of the shifter register multiplies the stored bit by a corresponding one of eight coefficients $\alpha_3$-$\alpha_{10}$, and digital adders sum the resulting products and apply the resulting sum, via a digital-to-analog converter (DAC), to an analog adder 1270. Adder 1270 combines an incoming signal Vin with the output from FIR 1210 to produce a corrected version of the signal Vin' on the input nodes of stages 1215, 1220, 1225, and 1230. In another embodiment analog summing is used to add eight independent DAC inputs to node Din. An adjustable delay line can be included to adjust the delays from clock signals CkdE and CkdO to center the output of FIR 1210 in the incoming data eyes and counteract inherent clockto-Q delays and set-up times. In the example, FIR 1210 includes a multiplexer that combines the two half-data-rate signals DataE and DataO into set of registers operating at the full data rate. FIR 1210 can also be implemented using two half-data-rate registers with outputs combined into a full data-rate signal for application to the DAC.

Figure 14:
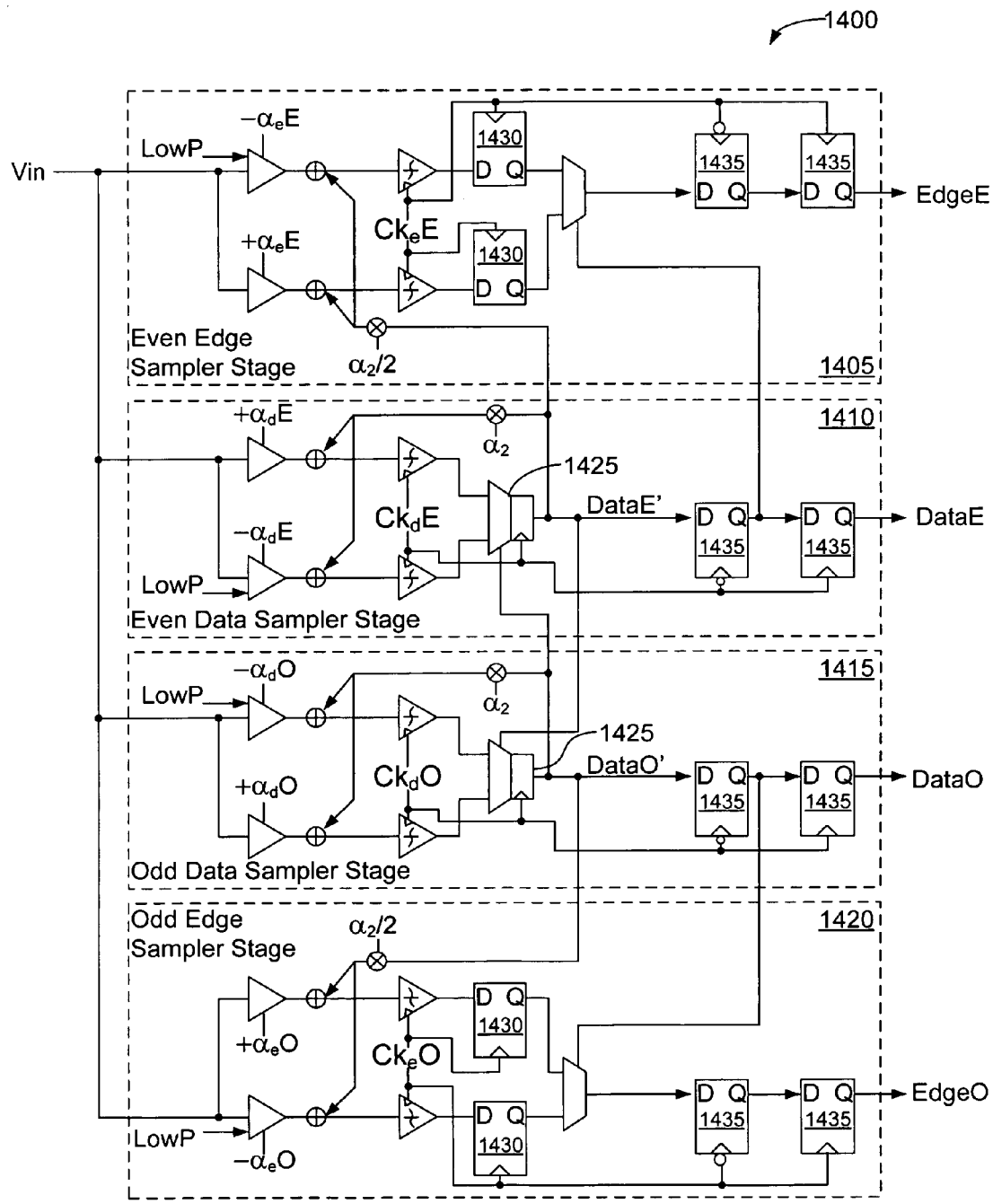
FIG. 14 depicts a receiver 1400 in accordance with a second DDR embodiment that recovers timing information from an incoming signal Vin.

FIG. 14 depicts a receiver 1400 in accordance with a second DDR embodiment that recovers timing information from an incoming signal Vin. Receiver 1400 is similar to receiver 1200 of FIG. 12, and includes an even-edge sampler stage 1405, an even-data sampler stage 1410, and odd-data sampler stage 1415, and an odd-edge sampler stage 1420. Receiver 1400 can include additional taps, as by inclusion of FIR 1210 of FIG. 12, for example, but these are omitted from FIG. 14. Receiver 1400 employs eight alpha values for the first filter tap, two for each of the four sampler stages 1405, 1410, 1415, and 1420. The naming convention for the alpha values identifies a value's use in receiver 1400: for example, the symbol $+\alpha_d E$ may be interpreted as the tap value "plus-alpha-data-even," which identifies that symbol as the $+\alpha 1$ value for the data sampler stage for even data.

Receiver 1400 is operationally similar to receiver 1200 of FIG. 12, so a detailed discussion of FIG. 14 is omitted. Of interest, receiver 1400 does not use a sample-and-hold strategy for capturing incoming data, and consequently omits sample switches (e.g., 1250 and 1232 of FIG. 12). The edge sampler stages need not await resolution of the tx(t−2) bit because they do not use feedback to correct for ISI associated with the tx(t−2) bit. There are three potential ISI components for sampled edges, which are discussed below in connection with FIG. 21. The edge sampler stages each employ two feed-forward paths to correct for two of these ISI components. Additional select logic downstream from receiver 1400 then excludes from consideration edge samples associated with data patterns that produce the third ISI component.

The absence of sample switches changes the timing of the signal paths through receiver 1400 as compared with receiver 1200. Additional changes include sequential multiplexers 1425 in each of data-sampler stages 1410 and 1415, sequential storage elements 1430 coupled to the input terminals of the multiplexer in each of edge-sampler stages 1405 and 1420, and sequential storage elements 1435 downstream of each multiplexer within each sampler stage. These sequential elements align the data and edge samples to facilitate filtering in the manner detailed above in connection with FIGS. 13A and 13B. Functional and timing differences between receivers 1400 and 1200 will be evident to those of skill in the art, so a detailed treatment of FIG. 14 is omitted for brevity.

Receiver 1400 supports a low-power mode that can be used for relatively relaxed channel conditions and lower speed. Asserting a signal LowP places receiver 1400 in the low-power mode by turning off half the feed-forward paths. Asserting signal LowP deactivates both the analog and sequential stages in one feed-forward path and fixes the associated output multiplexer to select the active feed-forward path. In some embodiments, each feed-forward path can be turned off independently using e.g. dedicated registers to provide test flexibility, to facilitate experimentation, and to allow for optimization of power and performance modes.

Figure 15:
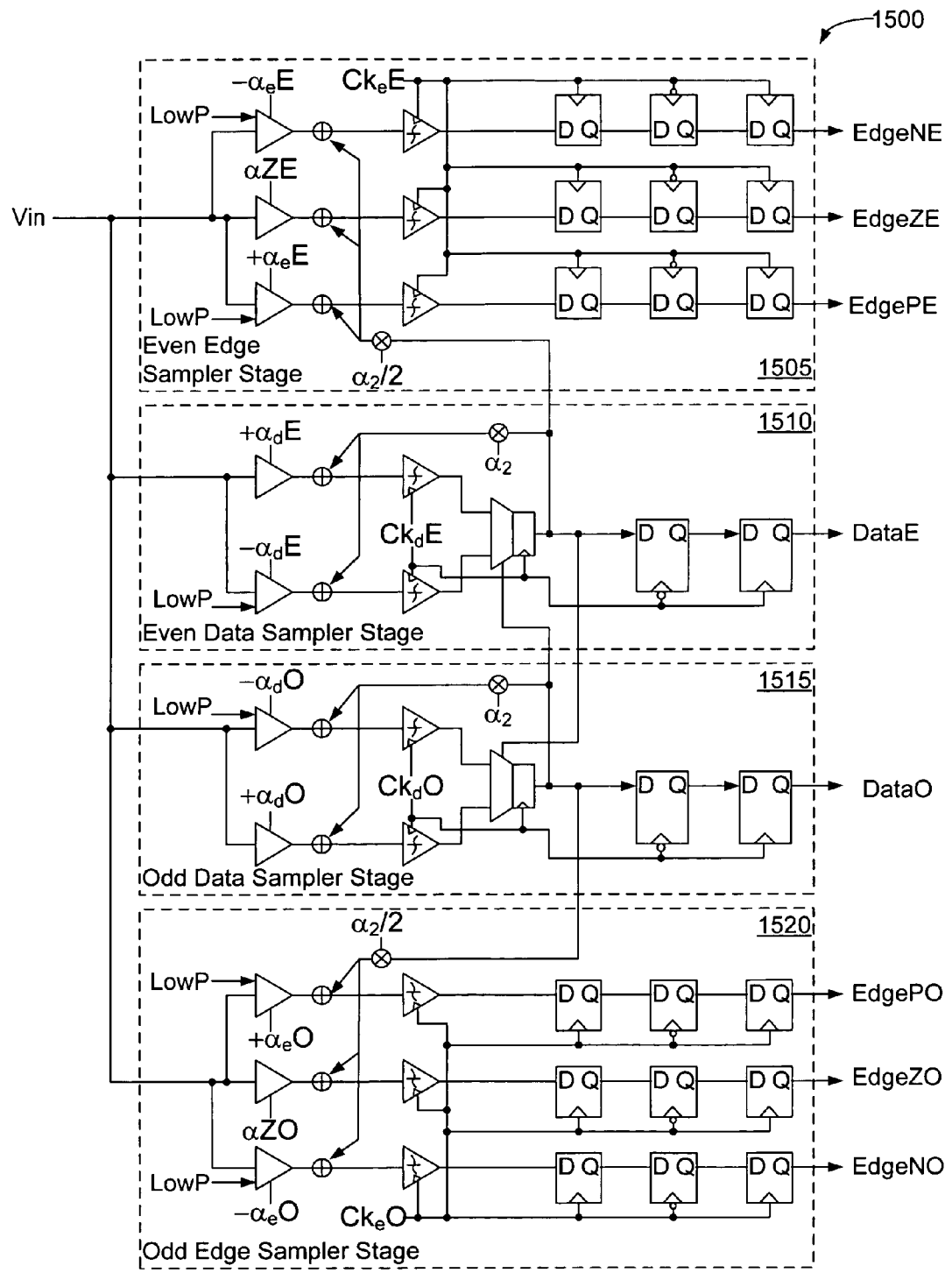
FIG. 15 depicts a receiver 1500 in accordance with a third DDR embodiment that recovers timing information from the incoming signal.

FIG. 15 depicts a receiver 1500 in accordance with a third DDR embodiment that recovers timing information from the incoming signal. Receiver 1500 is similar to receivers 1200 and 1400 of FIGS. 12 and 14, respectively, and includes an even-edge sampler stage 1505, an even-data sampler stage 1510, an odd-data sampler stage 1515, and an odd-edge sampler stage 1520. Receiver 1500 can include additional taps, as by inclusion of FIR 1210 of FIG. 12, for example, but these are omitted here.

Receiver 1500 is operationally similar to receiver 1400 of FIG. 14. The multiplexer of the edge sampler stages are omitted in receiver 1500, however, and a third feed-forward path is included in each of the two edge-sampler stages 1505 and 1520. Considering even edge sampler stage 1505, each of the three feed-forward paths includes a series of sequential storage elements timed to the even edge clock CkeE. Sampler stage 1505 corrects for each of three potential ISI components for sampled edges using the three separate paths. Additional select logic downstream from receiver 1500, embodiments of which are discussed below in connection the FIGS. 16 and 17, monitors incoming data patterns and selects edge samples appropriate for specific received data patterns.

Even-edge sampler stage 1505 produces, for each sampled edge, a first edge sample EdgeNE for the possibility that the two preceding data symbols represented a logic zero and the present data symbol is a logic one, a second edge sample EdgeZE for the possibility that the two preceding data symbols are either zero/one or one/zero and the present symbol is opposite the preceding symbol, and a third edge sample EdgePE for the possibility that the two preceding data symbols represented a logic one and the present symbol is a logic zero. The downstream sample-exclusion logic noted above then considers the appropriate one of the three edge samples based upon the received data pattern to adjust the sample timing as needed.

Receiver 1500 may support a low-power mode. In the depicted example, asserting a signal LowP disables two of the three feed-forward paths in each edge-sampler stage and disables one feed-forward path in each data-sampler stage. Other embodiments provide additional flexibility by allowing various combinations of the feed-forward paths to be enabled. A sufficient performance level might be obtained, for example, when only one feed-forward path is enabled in each edge-sampler and both feed-forward paths are enabled in the data-sampler stages. Many permutations are possible. Odd-edge sampler stage 1520 is operationally similar to stage 1505, so a detailed treatment of stage 1520 is omitted for brevity.

Figure 16:
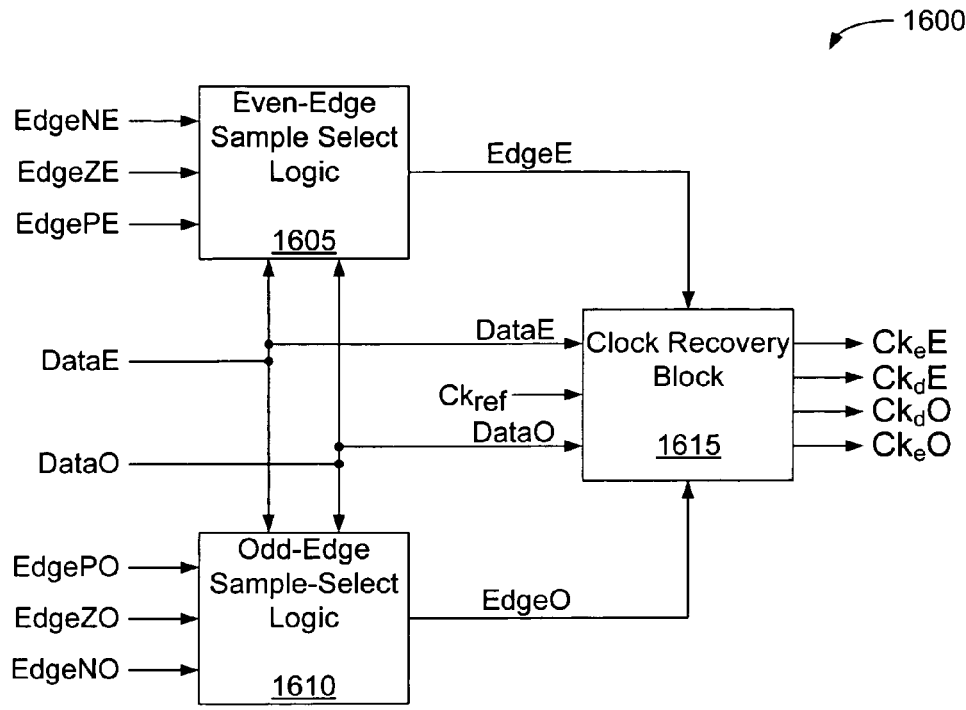
FIG. 16 details clock recovery circuitry 1600 for use with receiver 1500 of FIG. 15.

FIG. 16 details clock recovery circuitry 1600 for use with receiver 1500 of FIG. 15. Clock recovery circuitry 1600 includes even-sample select logic 1605, odd-sample select logic 1610 and a clock recovery block 1615. Select logic 1605 and 1610 each consider the incoming data patterns on lines DataE and DataO to determine which, if any, of the three respective edge samples should be used for timing recovery. Data patterns for which the two most-recent bits are the same are not indicative of edges, and so are to be excluded. In one embodiment, for example, select logic 1605 selects EdgeNE for EdgeE when the preceding three bits are 001 (i.e., $D_{N-2}=0$, $D_{N-1}=0$, and $D_N=1$), selects EdgePE for EdgeE when the preceding three bits are 110, and selects EdgeZE when the preceding three bits are representative of either 010 or 101. Other embodiments may use different preceding data patterns as selection criteria. Phase updates by clock recovery block 1615 may thus be based upon a selected subset of sampled edges. Select logic 1605 and 1610 are configurable in some embodiments, for example to consider different data patterns or all or a subset of the incoming edge samples (e.g., select logic 1605 might consider only edge samples EdgeZE and EdgePE). Other embodiments omit or power down one or more feed-forward paths: returning to FIG. 15, the uppermost feed-forward path of even-edge sampler stage 1505 can be omitted or disabled if data pattern 001 is to be ignored. Other embodiments might benefit from additional feed-forward paths, such as to allow for consideration of multi-level signals or multi-symbol PrDFE.

Clock recovery circuitry 1600 receives all of the data and edge values from receiver 1500. In one embodiment, select logic 1605 and 1610 and clock recovery block 1615 ignore samples of edges for which the two preceding data symbols differed. Clock recovery circuitry 1600 thus adjusts the timing of recovered clock signals $Ck_eE$, $Ck_dE$, $Ck_dO$, and $Ck_eO$ based only upon the data patterns 001 and 110. Timing adjustments may be limited to other received patterns or combinations of patterns in other embodiments. Excluding some edge data reduces the tracking bandwidth of clock recovery block 1615 but reduces the requisite number of feed-forward paths in the edge samplers, so it may be important to balance edge filtering with the data-recovery needs of a particular system.

Figure 17:
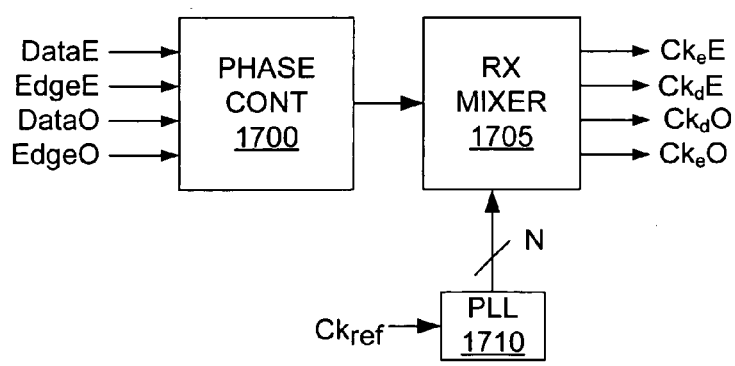
FIG. 17 depicts an embodiment of a well-known type of clock recovery block 1615.

FIG. 17 depicts an embodiment of clock recovery block 1615, which is of a well-known type and is thus not described in detail. In brief, a phase controller 1700 receives data samples DataE and DataO and edge samples EdgeE and EdgeO from the edge samplers as filtered by select logic 1605 and 1610. Based on these samples, phase controller 1700 determines that the sample clocks are early or late with respect to the incoming signal, and correspondingly adjusts the sampling phases provided by a phase mixer 1705, which combines selected ones of a plurality N of differently phased reference clocks from a phase-locked loop (PLL) 1710. As noted above, the timing adjustments may be limited to selected received data patterns. Other well known clock recover techniques may be used with e.g. receivers 1200, 1400, and 1500 in other embodiments.

Figure 18:
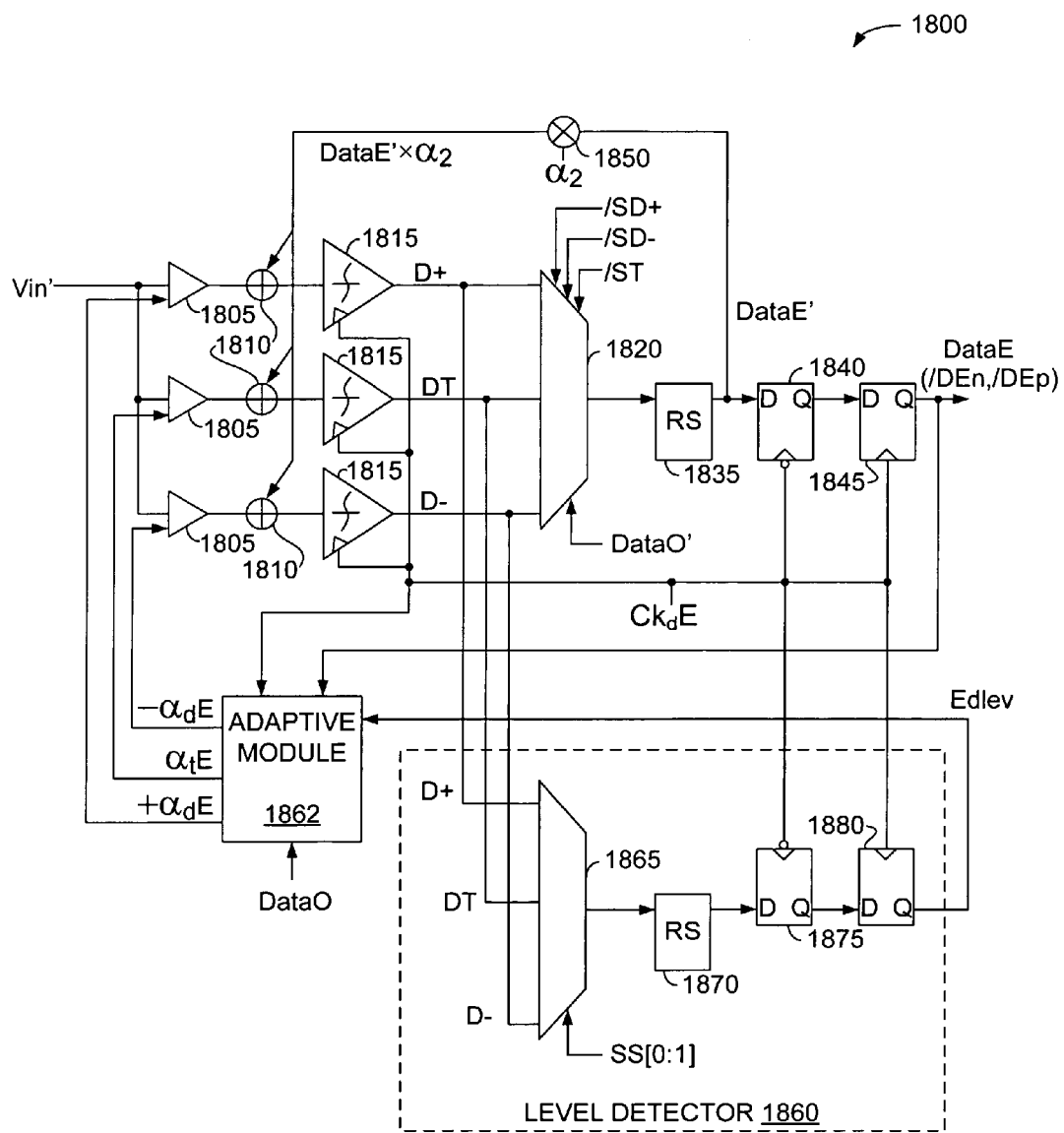
FIG. 18 depicts an embodiment of an even data sampler stage 1800 in accordance with another DDR embodiment.

FIG. 18 depicts an embodiment of an even data sampler stage 1800 in accordance with another DDR embodiment. Stage 1800 is similar to stage 1410 of FIG. 14, and sampler stages like stage 1800 can be used in place of the odd and even sampler stages of FIG. 14. For brevity, only the even data sampler is detailed here. Configuring sampler stage 1800 for use in extracting odd-data and edge samples is well within the ability of those of skill in the art.

Sampler stage 1800 includes three feed-forward paths, each of which includes a twist amplifier 1805, an adder 1810, and a sampler 1815. A three-input multiplexer 1820 selectively gates the output of one of samplers 1815 to output port DataE via an RS latch 1835 and a pair of flip-flops 1840 and 1845. A feedback path extends from the output of latch 1835 to each adder 1810 via a coefficient multiplier 1850.

Ignoring for the moment the middle feed-forward path, which provides a test signal DT to multiplexers 1820 and 1865, sampler stage 1800 implements two taps of a DFE in the manner detailed above in connection with FIGS. 9 through 15. Briefly, the first tap of stage 1800 is implemented as a PrDFE because the feedback timing path may exceed the minimum bit period. Correction factor $+\alpha_dE$ should be applied if the preceding bit was a logic one, whereas correction factor $-\alpha_dE$ should be applied if the preceding bit was a logic zero. Without sufficient time to resolve the previous bit, stage 1800 applies both correction factors $+\alpha_dE$ and $-\alpha_dE$ to the incoming signal Vin'. Multiplexer 1820 then selects the correct one of the two resulting signals once the previous odd data bit is resolved by the associated odd data sampler stage. The odd data sampler stage is not depicted in FIG. 18, but the output signal DataO' from such a stage is shown as a control input to multiplexer 1820. The second feedback tap, which applies correction factor $\alpha2$, is taken from the output of latch 1835 and applied to adders 1810.

The middle feed-forward path and separated controls signals /SD+ and /ST are included, in this embodiment, to facilitate testing and the derivation of correction factors $+\alpha_dE$ and $-\alpha_dE$. In testing, the middle sampler 1815 can be substituted for either of the other samplers, enabling test engineers to isolate faults and otherwise analyze system performance. In support of this substitution, multiplexer 1820 includes three additional select terminals /SD+, /SD-, and /ST. The effects of these signals are detailed below in connection with FIG. 19. The middle sampler 1815 can also be used by embedded logic or software associated with the communication channel. Such embedded logic or software can periodically or continuously monitor channel performance and adjust the receiver as needed to adjust a number of metrics of interest, such as to maintain a desired level of speed performance, a minimum error rate, or both.

In support of both testing and the derivation of correction factors, the twist amplifier 1805 of the middle path receives a test correction factor $\alpha_tE$ that can be adjusted independent of correction factors $+\alpha_dE$ and $-\alpha_dE$. This allows test engineers to explore the voltage margin for a given incoming signal Vin'. Further, the provision of an extra feed-forward path with a variable test correction factor $\alpha_tE$ allows stage 1800 to adaptively explore the characteristics of incoming data to refine the values of correction factors $+\alpha_dE$ and $-\alpha_dE$. These values can be set once, such as at start up, or can be continuously or periodically updated to reflect changes in the system noise environment, the supply voltage, temperature, etc.

Stage 1800 additionally includes embodiments of a data-edge level detector 1860 and an adaptive module 1862 that may be used to explore the boundaries (e.g. timing and voltage) of incoming signal Vin' for test and to adaptively refine correction factors $+\alpha_dE$ and $-\alpha_dE$. Level detector 1860 includes a three-input multiplexer 1865, a latch 1870, and a pair of flip-flops 1875 and 1880. Multiplexer 1865 conveys one of the three output signals D+, DT, and D- from samplers 1815 to latch 1870 as directed by a two-bit sampler-select signals SS[0:1]. In normal operation, multiplexer 1820 alternatively selects signals D+ and D- at the direction of signal DataO'. Level detector 1860 can be constantly or periodically enabled during such times to convey signal DT from sampler 1800 as an edge-data level signal Edlev. As detailed below in connection with FIG. 21, signal Edlev may be used in the derivation of correction factors $+\alpha_dE$ and $-\alpha_dE$. Multiplexer 1865 may select one of its other inputs D+ or D- for test purposes, and may be omitted if such testing flexibility is not required. An embodiment of adaptive module 1862 is detailed below in connection with FIG. 23. Multiplexer 1865 may also select one of inputs D+ and D- when the sampler that sources the selected signal is replaced, using multiplexer 1820, with the middle sampler 1815. The ability to substitute signal DT for either of signals D+ or D- allows the data samplers to be offset-calibrated during live operation.

Figure 19:
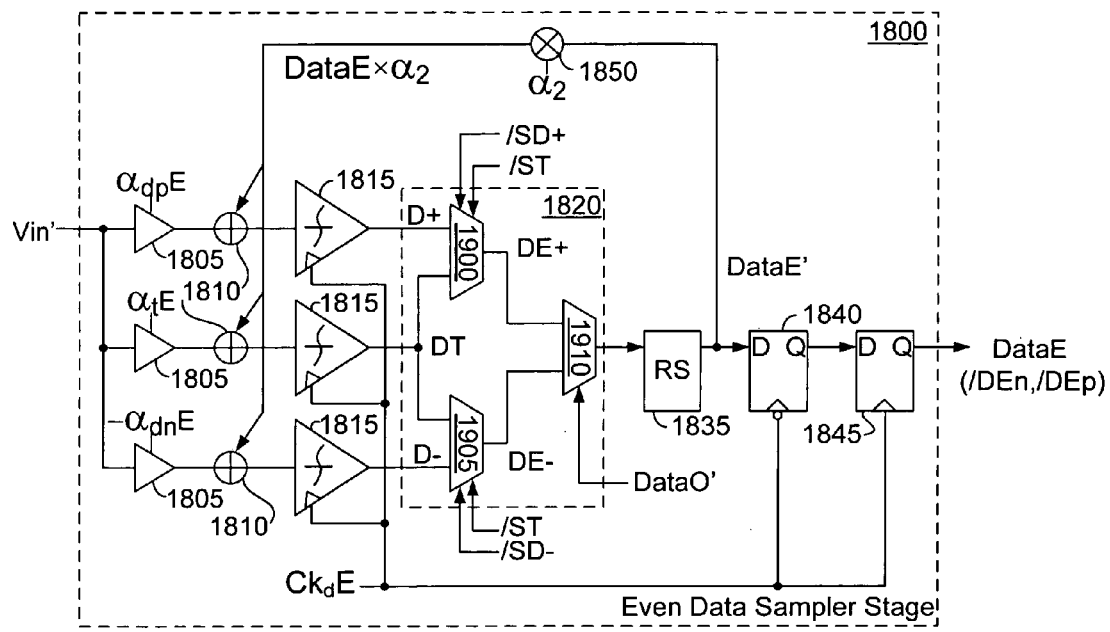
FIG. 19 depicts sampler stage 1800 in accordance with one embodiment.

FIG. 19 depicts sampler stage 1800 in accordance with one embodiment. FIG. 19 details multiplexer 1820 and omits level detector 1860. Multiplexer 1820 is, in this embodiment, made up of three separate two-input multiplexers 1900, 1905, and 1910, and is responsive to four select signals /SD+, SD-, /ST and DataO'. The first two multiplexers 1900 and 1905 select from among signals D+, D-, and DT to produce alternative even data samples DE+ and DE-. The third multiplexer 1910 selects between samples DE+ and DE- at the direction of the last resolved data symbol of signal DataO' in support of PrDFE operation.

Turning to multiplexers 1900 and 1905, asserting signal /SD+ (driving it low) causes multiplexer 1900 to select output D+, whereas asserting signal /ST causes multiplexer 1900 to select output DT. Similarly, asserting signal /SD- (driving it low) causes multiplexer 1905 to select output D-, whereas asserting signal /ST causes multiplexer 1905 to select output DT. Multiplexer 1820 is thus capable of substituting the middle feed-forward path (DT) in lieu of either of the other feed-forward paths. Providing each of multiplexers 1900 and 1905 with two select terminals allows them to reduce glitches that result when switching between feed-forward paths. In switching multiplexer 1900 from DT to D+, for example, signal /SD+ can be asserted before signal /ST is deasserted such that output signal DE+ is derived for a time from both input signals to multiplexer 1900. Signal /ST can then be deasserted to complete the switch.

The speed at which feedback can be provided for tap value $\alpha 2$ and any other downstream filter taps (e.g., $\alpha 3$-$\alpha N$) depends in part upon the speed at which samplers 1815, multiplexers 1900, 1905, and 1910, and latch 1835 convey and select signals. Some embodiments employ dynamic logic circuits that expedite signal transmission through these elements.

Figure 20A:
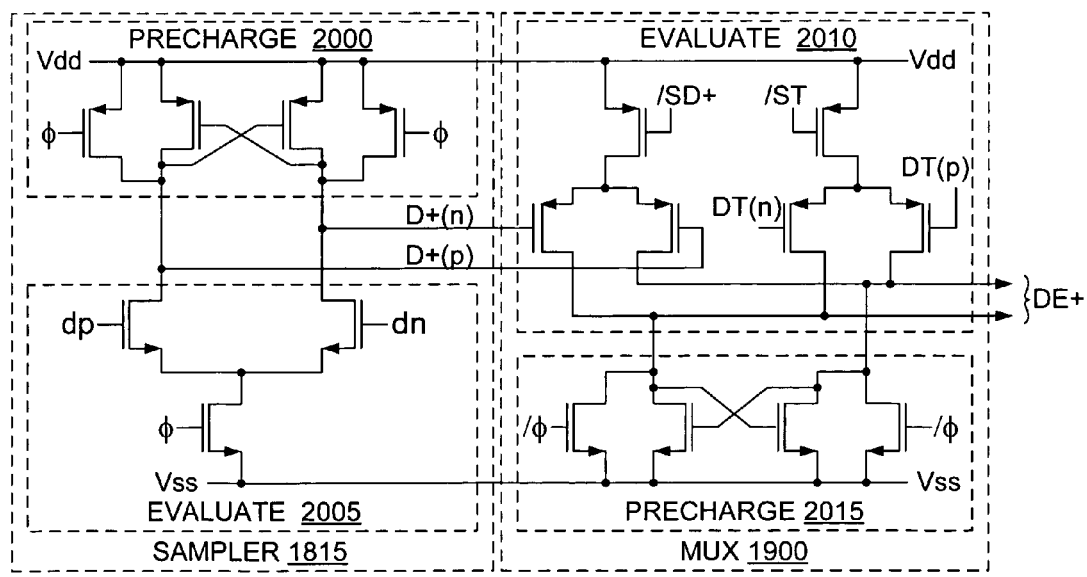
FIG. 20A details embodiments of the topmost sampler 1815 of FIGS. 18 and 19 and the associated multiplexer 1900 instantiated as cascaded dynamic logic circuits, or "Domino logic," for improved speed performance.

FIG. 20A details embodiments of the topmost sampler 1815 of FIGS. 18 and 19 and the associated multiplexer 1900 instantiated as cascaded dynamic logic circuits, or "Domino logic," for improved speed performance. Sampler 1815 is essentially a sense amplifier, the differential outputs of which are pre-charged high when clock signal $\phi$ is low. Clock signal $Ck_eE$ is differential in this embodiment, with clock signals $\phi$ and /$\phi$ representing the two differential components. Sampler 1815 and multiplexer 1900 together form a type of Domino logic circuit.

Sampler 1815 includes respective precharge and evaluate sections 2000 and 2005. When clock signal $\phi$ is low, precharge section 2000 pulls both output nodes D+(n) and D+(p) toward the upper supply voltage (e.g., Vdd) on the respective power-supply terminal. Then, when clock signal $\phi$ goes high, evaluate section 2005 pulls one of output nodes D+(n) and D+(p) low in response to the differential input signal dp/dn from e.g. the corresponding one of adders 1810. Precharge section 2000 returns nodes D+(n) and D+(p) to their high precharge state when clock signal $\phi$ returns low.

Multiplexer 1900 includes respective evaluate and precharge sections 2010 and 2015. Evaluate section 2010 receives differential signals D+(n) and D+(p), collectively D+, from the corresponding sampler 1815 of stage 1800 (FIG. 18), and receives a similar set of differential signals DT(n) and DT(p), collectively DT, from the sampler 1815 of the middle feed-forward path of stage 1800. Evaluate section 2010 includes two differential input stages, one for each of differential signal pairs D+(n)/D+(p) and DT(n)/DT(p). Additional input stages can also be included to increase the number of available input ports.

When clock signal /$\phi$ is high (i.e., clock signal $\phi$ is low), precharge section 2015 pulls both output nodes DE+toward the lower supply voltage (e.g. Vss) on the respective power-supply terminal. Asserting one of select signals /SD+ and /ST enables the respective differential input signal to convey either signal D+ or DT as differential output signal DE+ to multiplexer 1910 of FIG. 19. Latch 1835, also of FIG. 19, may be implemented in standard CMOS logic to convert the resolved data signal to a single-ended or differential sequential logic signal. As noted in connection with FIG. 19, both signals /SD+ and /ST can be enabled simultaneously to support make-before-break switching between samplers.

Figure 20B:
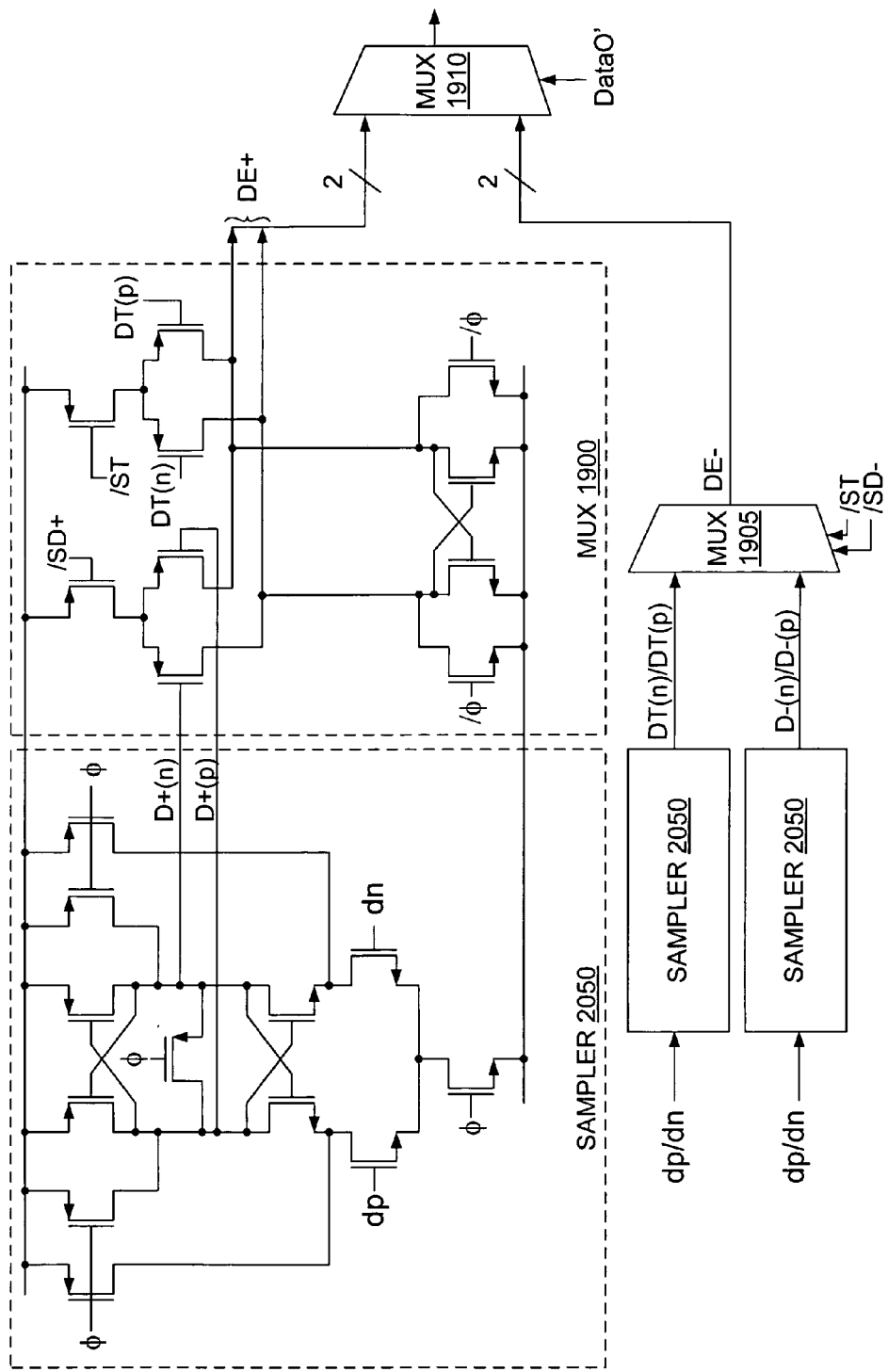
FIG. 20B depicts three samplers 2050 operatively coupled to multiplexers 1900, 1905, and 1910 of FIG. 19.

FIG. 20B depicts three samplers 2050 operatively coupled to multiplexers 1900, 1905, and 1910 of FIG. 19. Samplers 2050, one of which is shown in detail, may be used in place of samplers 1815 of FIG. 20A. As compared with samplers 1815, each of samplers 2050 includes a number of additional PMOS transistors that increase the speed at which the sampler precharges its output nodes, and cross-coupled NMOS transistors to prevent current flow once the sampling operation is complete.

Multiplexer 1905 may be identical at the transistor level to multiplexer 1900, so a detailed treatment of multiplexer 1905 is omitted. Multiplexer 1910 may also be implemented in dynamic logic, though the sense of the evaluate and precharge stages would be inverted as compared with multiplexer 1900 to facilitate Domino cascading. With reference to FIG. 18, multiplexer 1865 may be implemented using dynamic logic like multiplexers 1900, 1905, and 1910, though the absence of PrDFE functionality reduces the requisite select speed and therefore allows for configurations that offer lower speed performance.

Figure 21:
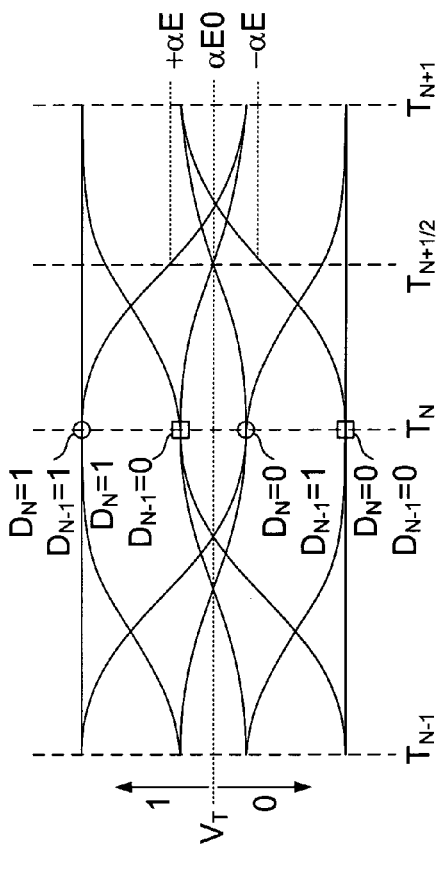
FIG. 21 illustrates the bimodal distribution of a binary signal observed at a signal receiver when the primary source of ISI is the signal transmitted in the immediately preceding symbol time (or, after all other significant sources of ISI have been corrected, e.g. by DFE).

FIG. 21 illustrates the bimodal distribution of a binary signal observed at a signal receiver when the primary source of ISI is the signal transmitted in the immediately preceding symbol time (or, after all other significant sources of ISI have been corrected, e.g. by DFE). That is, the symbol sampled at time $T_{N-1}$ is the primary source of ISI in the symbol sampled at time $T_N$; the symbol sampled at time $T_N$ is the primary source of ISI in the symbol sampled at time $T_{N+1}$; and so forth. Referring to the signal levels at time $T_N$, it can be seen that if the preceding symbol was a logic '1' (i.e., $D_{N-1}=1$), the partial response to the preceding symbol will raise the signal level at time TN to one of the circled levels. If the preceding symbol was a logic '0' (i.e., $D_{N-1}=0$), , the partial response to the preceding symbol will lower the signal level at time TN to one of the square-designated levels. These levels may be defined for either single-ended or differential signals. In a non-PrDFE signaling system, the incoming signal is sampled and compared with a reference voltage level at the midpoint between the steady state extremes (i.e., midway between the '11' and '00' signal levels). Accordingly, the worst case voltage margins (i.e., smallest voltage differences between the signal and reference voltage) occur when the signal transitions from a '1' to a '0' or vice-versa; the '10' and '01' signaling levels become indistinguishable when the partial response level (i.e., residual signal level from the preceding symbol transmission) is large.

FIG. 21 depicts an edge-sample instant at time $T_{N+1/2}$. Returning to receiver 1500 of FIG. 15, edge sampler 1505 considers four possible types of signal edges by application of three threshold values +$\alpha_e$E, $\alpha$ZE, and -$_e$E. Of these, threshold value +$\alpha_e$E is the appropriate correction factor for pattern 110 (i.e., $D_{N-2}=1$, $D_{N-1}=1$, and $D_N=0$), -$\alpha_e$E is the appropriate correction factor for pattern 001, and $\alpha$EO (zero volts in this example) is the appropriate correction factor for patterns 010 and 101.

Figure 22:
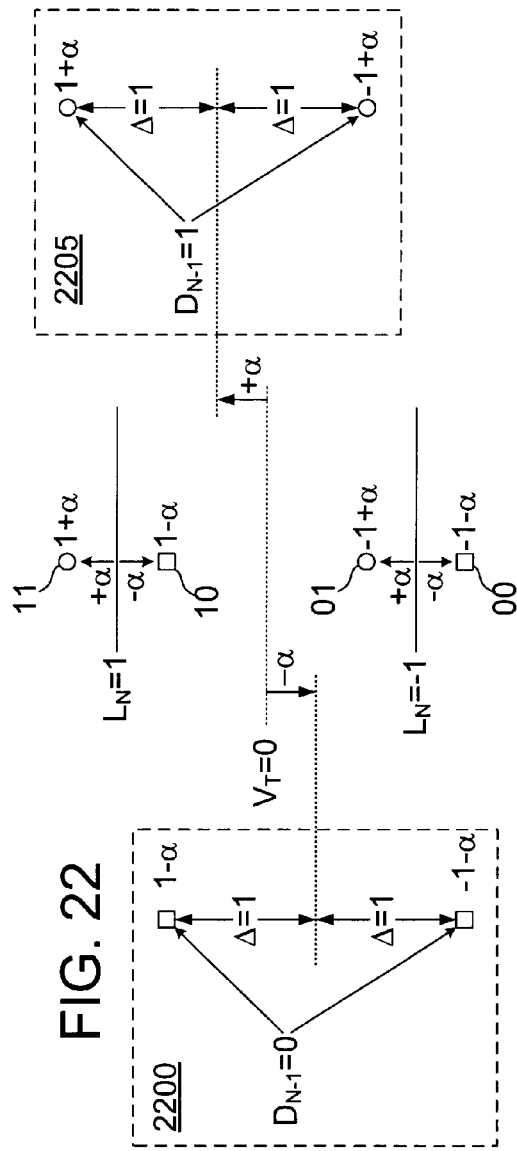
FIG. 22 illustrates the four partial response signal levels depicted in FIG. 21 relative to nominal voltage level VT.

FIG. 22 illustrates the four partial response signal levels depicted in FIG. 21 relative to nominal voltage level $V_T$. In the case of a differential signaling system, the partial response to the preceding symbol may be viewed as increasing or decreasing the differential amplitude (i.e., the difference between the signals that form the differential signal pair) relative to a nominal differential amplitude. Normalizing the positive and negative signal levels for the nominal differential amplitude to 1 and −1, respectively, voltage level $V_T$ becomes zero, and the four possible signal levels become 1+$\alpha$, 1−$\alpha$, −1+$\alpha$ and −1−$\alpha$, where a represents the magnitude of the partial response to the preceding symbol. Thus, when the preceding symbol, $D_{N-1}$, is a '0', the incoming symbol, $D_N$, is represented by a signal level at either 1−$\alpha$ or −1−$\alpha$, depending on whether $D_N$ is a '1' or '0'. Similarly, when $D_{N-1}=1$, the incoming symbol is represented by a signal level at either 1+$\alpha$ or −1+$\alpha$ according to the state of the current symbol $D_N$. In the former case (i.e., when $D_{N-1}=0$), the two complementary signal levels, −1−α and 1−α, have a common mode of level −α, as shown in box 2200. In the latter case (i.e., when $D_{N-1}=1$), the two complementary signal levels, 1+α and −1+α, have a common mode of +α, as shown in box 2205.

In the preceding examples, each partial response receiver includes a pair of data samplers, one referenced to reference level +α and the other to reference level −α. The examples depict multi-tap receivers, so the partial-response tap values are designated +α1 and −α1 to distinguish them from the subsequent tap values α2 through αN. In some instances, the first tap values employ naming conventions that differ slightly from the simple ±α1 to distinguish the alpha levels for odd and even edge and data sampler stages. In each case, the first-tap ±α correction factors can be derived using the methods and circuits detailed in connection with FIGS. 21 through 23.

Figure 23:
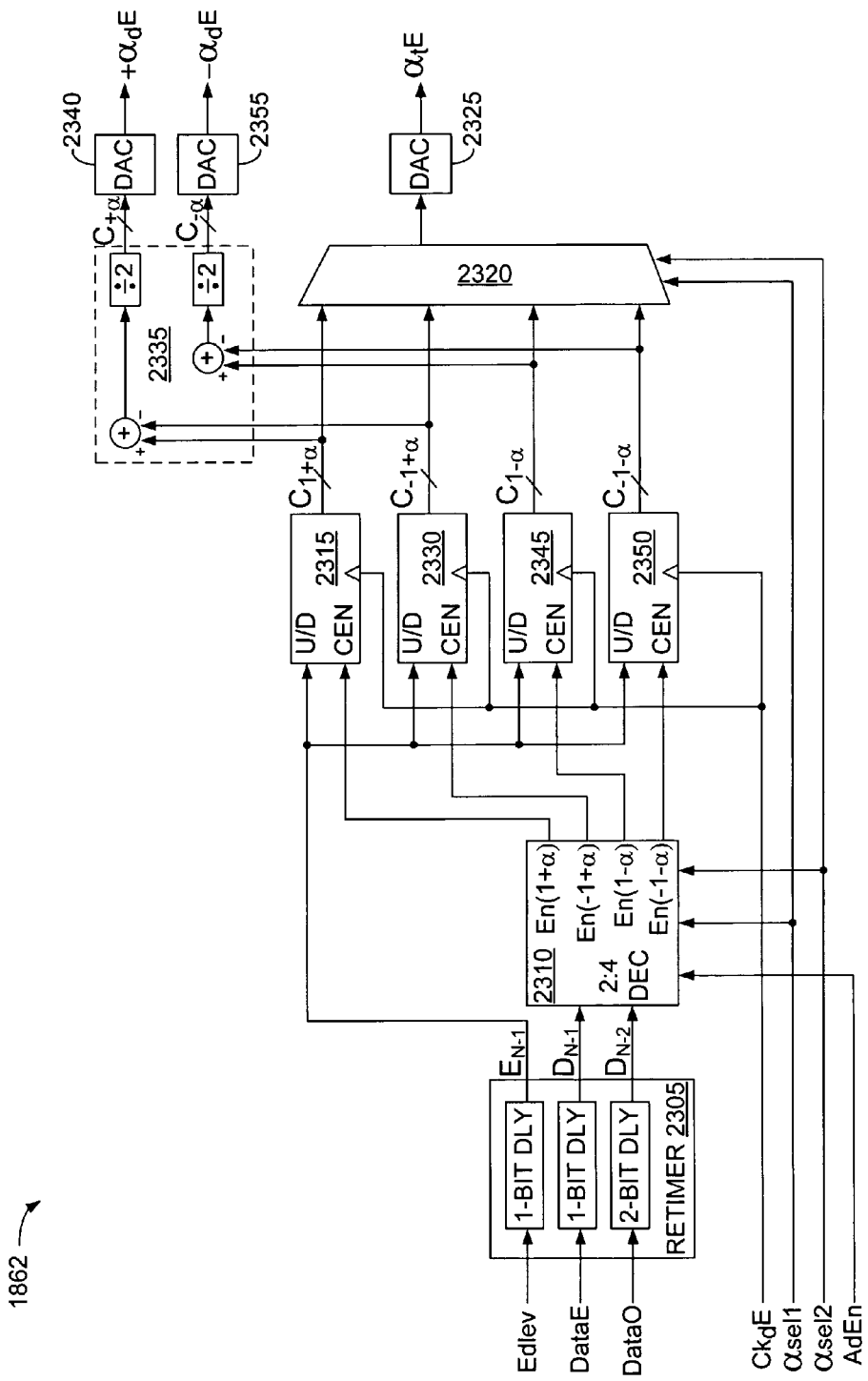
FIG. 23 depicts adaptive module 1862 of FIG. 18 in accordance with one embodiment.

FIG. 23 depicts adaptive module 1862 of FIG. 18 in accordance with one embodiment. Adaptive module 1862 derives correction factors for even data samples, but may be easily adapted to similarly derive alpha values for odd data samples and odd and even edge samples, as will be evident to those of skill in the art. In some embodiments, much of the logic employed to derive alpha values for the various samplers is provided by a general-purpose state machine, such as an embedded processor.

A retimer 2305 aligns odd and even data bits with a corresponding level sample Edlev by imposing two bits of delay on odd data signal DataO and one bit of delay on each of signals DataE and Edlev to produce respective signals $E_{N-1}$, $D_{N-1}$, and $D_{N-2}$. The remaining circuitry of module 1862 employs these three signals to derive alpha correction factors $\pm\alpha_d E$. As noted above in connection with FIG. 22, the +α correction factor (e.g., $+\alpha_d E$) is the average of levels 1+α and −1+α, and the −α correction factor (e.g., $-\alpha_d E$) is the average of levels 1−α and −1−α. Adaptive module 1862 derives each of the four levels 1+α and −1+α, 1−α, and −1−α and from them calculates correction factors $\pm\alpha_d E$.

Each of the four levels 1+α and −1+α, 1−α, and −1−α is derived in turn. Beginning with the derivation of level 1+α, recall from the discussion of FIG. 22 that 1+α is the signal level when input signal Vin' experiences two consecutive symbols representative of logic ones (i.e., $D_{N-1}=1$ and $D_{N-2}=1$).

The derivation of the 1+α level begins when signal AdEn is asserted, to enable calibration generally, and alpha-select signals αsel1 and αsel2 are both asserted to (both set to logic one) to enable calibration of the 1+α level. A decoder 2310, when thus enabled, asserts an enable signal En(1+α) whenever the last two data bits $D_{N-1}$ and $D_{N-2}$ are resolved to represent logic ones. Assertion of enable signal En(1+α) enables a counter 2315, which then either increments or decrements based upon the value of level signal $E_{N-1}$. Alpha-select signals αsel1 and αsel2, when asserted together, cause a multiplexer 2320 to convey the contents $C_{1+\alpha}$ a of counter 2315 to a digital-to-analog converter (DAC) 2325, which converts digital signal $C_{1+\alpha}$ into the analog tap value $\alpha_r E$ for the middle feed-forward path of sampler stage 1800 of FIG. 18. This process repeats until counter 2315 eventually arrives at a value for which tap value $\alpha_r E$ causes the corresponding sampler 1815 to produce, on average, the same number of one and zero values for data signal DT. The resulting tap value $\alpha_r E$ is a measure of the 1+α level, for which count $C_{1+\alpha}$ a is a digital representation.

The foregoing process is repeated to derive level −1+α. AdEn is once again asserted, or is left asserted, to enable calibration generally, and alpha-select signals αsel1 and αsel2 are set to zero and one, respectively, to enable calibration of the −1+α level. Decoder 2310 then asserts an enable signal En(−1+α) whenever the last two data bits $D_{N-1}$ and $D_{N-2}$ are resolved to respectively represent logic zero and logic one. Assertion of enable signal En(−1+α) enables a counter 2330, which then either increments or decrements based upon the value of level signal $E_{N-1}$. Alpha-select signals αsel1 and αsel2, when respectively zero and one, cause multiplexer 2320 to convey the contents $C_{-1+\alpha}$ of counter 2330 to DAC 2325, which converts digital signal $C_{-1+}$ a into the analog tap value $\alpha_r E$ to the middle feed-forward path of sampler stage 1800 of FIG. 18. Counter 2330 thus eventually arrives at a value for which tap value $\alpha_r E$ causes the corresponding sampler 1815 to produce, on average, the same number of one and zero values for data signal DT. This value of tap coefficient $\alpha_r E$ is a measure of the −1+α level, for which count $C_{-1+\alpha}$ is a digital representation.

As illustrated using block 2205 in FIG. 22, tap value $+\alpha_d E$ is the average of levels 1+α and −1+α. An averaging circuit 2335 sums values $C_{1+\alpha}$ and $C_{-1+\alpha}$ and divides the result by two to obtain a count $C_{+\alpha}$ representative of tap value $+\alpha_d E$. A second DAC 2340 converts count $C_{+\alpha}$ into tap value $+\alpha_d E$. Count $C_{+\alpha}$ may be captured in a register in some embodiments to prevent updates of counters 2315 and 2330 from affecting tap value $+\alpha_d E$ until e.g. signal AdEn is deasserted.

The foregoing process is repeated for the remaining data patterns 1-0 and 0-0 to fill two more counters 2345 and 2350 with respective counts $C_{1-\alpha}$ and $C_{-1-\alpha}$ representative of appropriate levels for 1−α and −1−α. Averaging circuit 2335 sums counts $C_{1-\alpha}$ and $C_{-1-\alpha}$ and divides the result by two to obtain an average count $C_{-\alpha}$ representative of tap value $-\alpha_d E$. A third DAC 2355 converts count $C_{-\alpha}$ to tap coefficient $-\alpha_d E$. Count $C_{-\alpha}$ may be captured in a register in some embodiments to prevent updates of counters 2345 and 2350 from affecting tap value $-\alpha_d E$ until e.g. signal AdEn is deasserted.

While detailed in connection with specific PrDFE architectures, other architectures are readily adapted for use in the communication systems described herein. Suitable PrDFE circuits are detailed, for example, in U.S. patent application Ser. No. 10/662,872 entitled "Partial Response Receiver," by Vladimir M. Stojanovic, Mark A. Horowitz, Jared L. Zerbe, Anthony Bessios, Andrew C. C. Ho, Jason Wei, Grace Tsang, and Bruno W. Garlepp; and U.S. patent application Ser. No. 10/875,086 entitled "Offset Cancellation in a Multi-Level Signaling System," by Vladimir M. Stojanovic, Andrew Ho, Fred F. Chen, and Bruno W. Garlepp. Test methodologies that can be used, for example, in connection with the above-detailed circuits are detailed in U.S. patent application Ser. No. 10/815,604 entitled "Margin Test Methods and Circuits," by Andrew Ho, Vladimir M. Stojanovic, and Bruno W. Garlepp.

Figure 24:
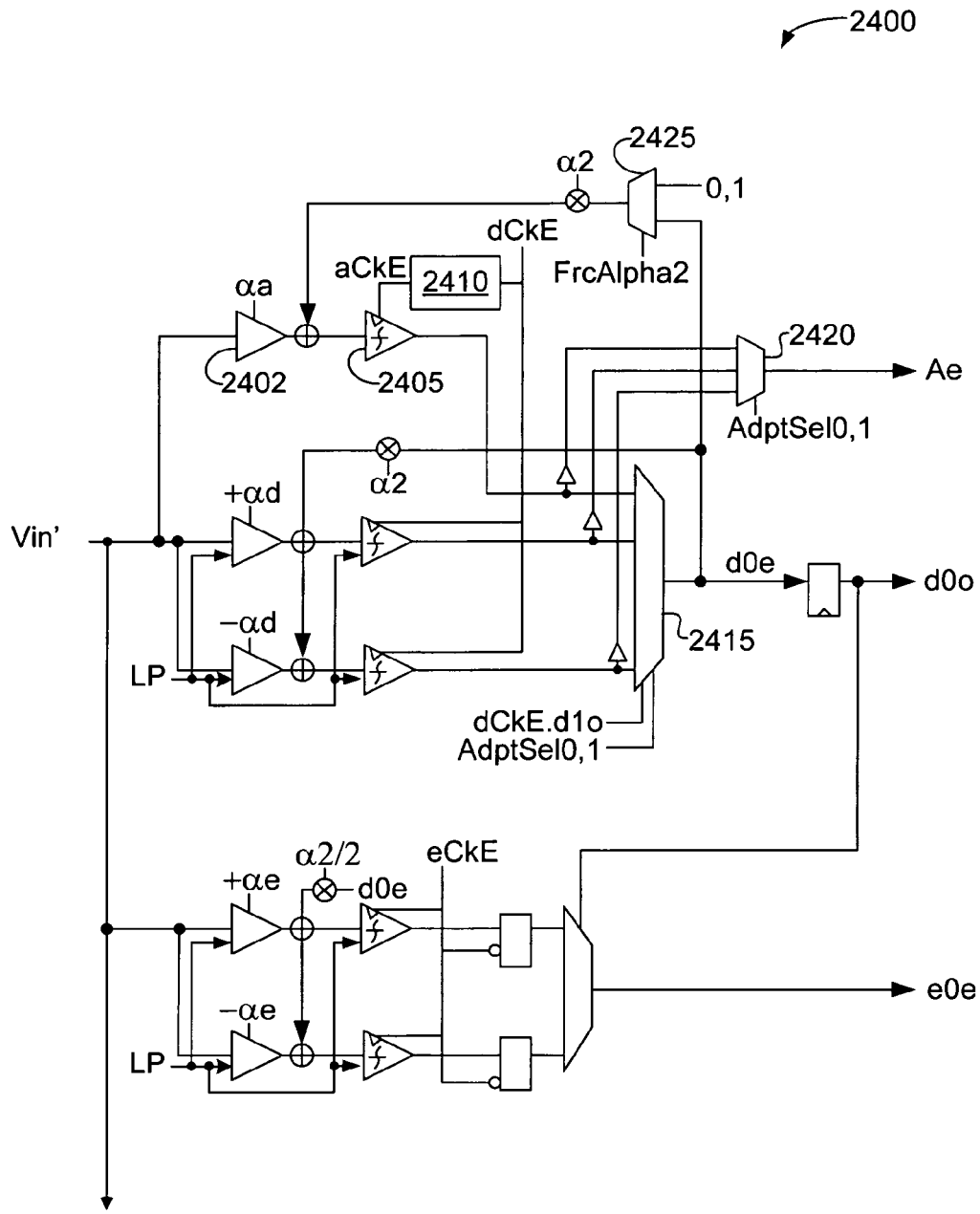
FIG. 24 depicts an embodiment of an even data sampler stage 2400 in accordance with another DDR embodiment.

FIG. 24 depicts an embodiment of an even data sampler stage 2400 in accordance with another DDR embodiment. Stage 2400 is similar to stage 1800 of FIG. 18, and can be used in place of the odd and even sampler stages of FIG. 18. For brevity, only the even data sampler is detailed here. Configuring sampler stage 2400 for use in extracting odd-data and edge samples is well within the ability of those of skill in the art.

Sampler stage 2400 includes three feed-forward paths that can be used in the manner discussed above in connection with FIG. 18. The two lower-most paths apply tap coefficients +αd and −αd. A third feed-forward path includes an additional twist amplifier 2402, an additional adaptive sampler 2405, and a phase shifter 2410. A multiplexer 2415 selects the appropriate sampler output based upon the logic level resolved for the most-recently received bit, or possibly some other prior bit or bits. The third input terminal to multiplexer 2415 and the two select terminals DCkE.d1o and AdpSel0,1 together allow stage 2400 to replace one of the lower-most feed-forward paths with amplifier 2402 and sampler 2405. A multiplexer 2420, controlled by a select signal AdptSel0, 1, selects the output of any of the amplifier/sampler pairs for selection by previous resolved bit d1o. A third multiplexer 2425 responds to a select signal FrcAlph2 by applying either fixed (0 or 1) or dynamic feedback.

Sampler stage 2400 can be used to characterize the incoming data Vin'. For example, multiplexer 2415 can connect the output of sampler 2405 to output terminal Ae, allowing for downstream comparisons of signals d0e and Ae. Using output signal d0e as a reference for comparison, phase shifter 2410 and amplifier 2402 can each be adjusted to explore the respective timing and voltage margins of the incoming signal. Mux 2425 can change the feedback provided to sampler 2405. In another test feature, mux 2415 can substitute one of the lower two amplifier/receiver pairs with amplifier 2402 and sampler 2405. Mux 2420 can then select the output of the omitted amplifier/sampler pair. The output of the omitted pair can then be monitored via terminal Ae, and the threshold and/or timing of the omitted pair to be adjusted (e.g., to obtain a preferred BER).

While detailed in connection with specific PrDFE architectures, other architectures are readily adapted for use in the communication systems described herein. Suitable PrDFE circuits are detailed, for example, in U.S. patent application Ser. No. 10/662,872 entitled "Partial Response Receiver," by Vladimir M. Stojanovic, Mark A. Horowitz, Jared L. Zerbe, Anthony Bessios, Andrew C. C. Ho, Jason Wei, Grace Tsang, and Bruno W. Garlepp; and U.S. patent application Ser. No. 10/875,086 entitled "Offset Cancellation in a Multi-Level Signaling System," by Vladimir M. Stojanovic, Andrew Ho, Fred F. Chen, and Bruno W. Garlepp. Test methodologies that can be used, for example, in connection with the above-detailed circuits are detailed in U.S. patent application Ser. No. 10/815,604 entitled "Margin Test Methods and Circuits," by Andrew Ho, Vladimir M. Stojanovic, and Bruno W. Garlepp.

Figure 25:
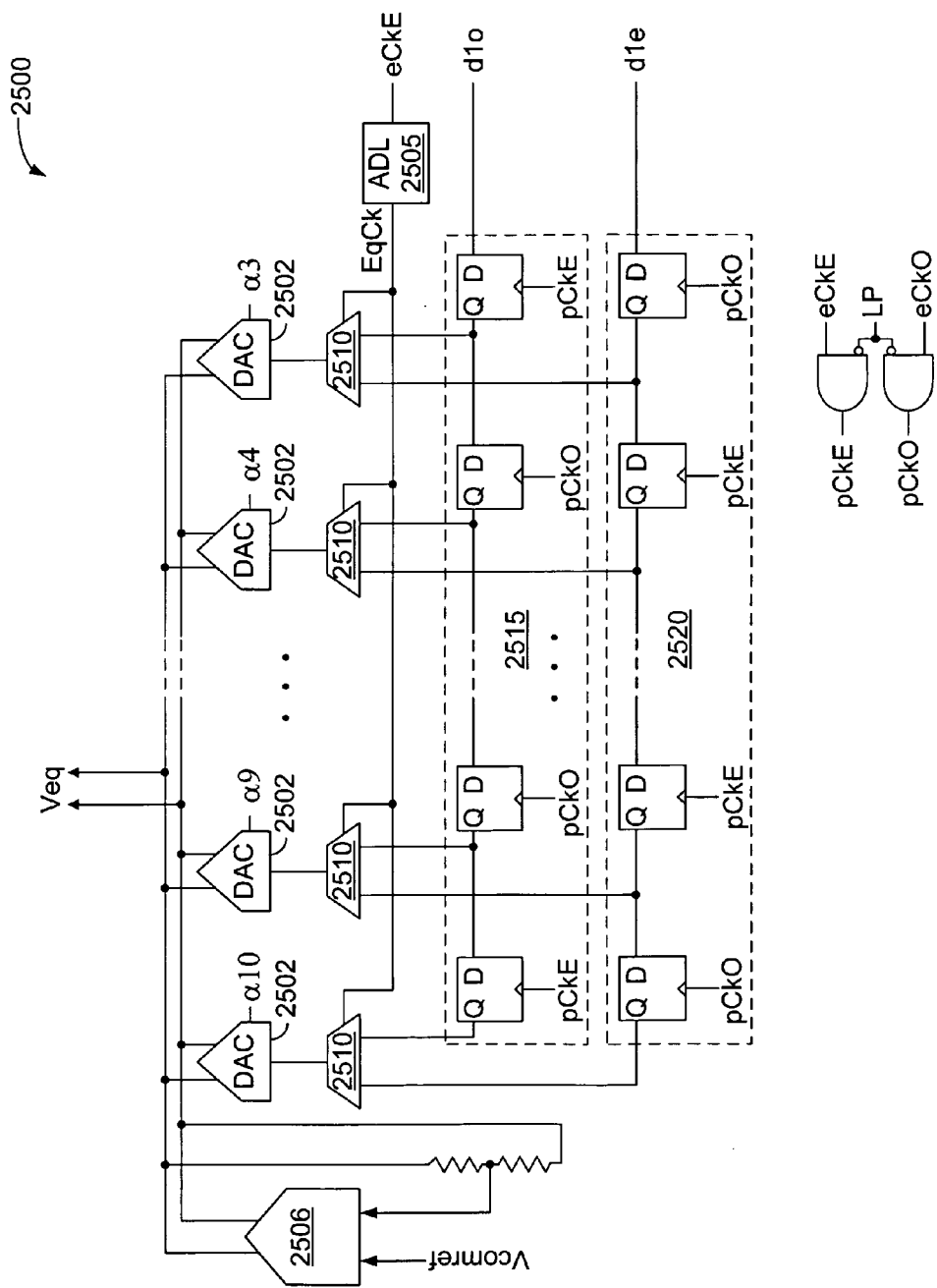
FIG. 25 depicts an embodiment of an FIR filter 2500 suitable for use in a number of the foregoing embodiments.

FIG. 25 depicts an embodiment of an FIR filter 2500 suitable for use in a number of the foregoing embodiments. With respect to FIG. 9, for example, filter 2500 can be an embodiment of FIR 935 to provide the last eight taps of the receiver weighted by tap coefficients $\alpha 3$-$\alpha 10$. The input signal Vin is offset by the summing output currents from eight multiplying DACs 2502, each of which multiplies a one-bit value from a respective one of multiplexers 2510 by a respective tap weight, or $\alpha$ correction factor. Each tap weight has 4 bits of adjustment and one bit for sign, resulting in a total of five bits of control per tap weight, RxTap[10:3]<4:0>, where RxTap[#]<4:0>=$\alpha$#.

An equalizer clock signal EqCk, which may be differential, is phase controlled using e.g. an adjustable delay line 2505. Delay line 2505 is adjusted using a clock-and-data recovery circuit (CDR) normally used to adjust the sample instants for the incoming data to the center of the data eyes. In a DFE calibration mode, an alternative data source may drive the filter 2500 and the associated DFE. The equalizer clock EqCk employed by the receive DFE is then allowed to move with respect to the receive clock at the direction of the CDR. This process adjusts the timing of the data traversing the receive DFE so that the feedback provided by the DFE output is aligned with the incoming test data at Veq. Once the calibration is finished, the delay offset is fixed (saved) for use in the normal operating mode, during which time the CDR adjusts the recovered clock RecClk, and consequently the offset of the equalizer clock signal, to maintain its alignment with the incoming data.

ADL 2505 need not be included as part of filter 2500, but can be implemented as part of the associated CDR. Moreover, the function of ADL 2505 can be implemented using e.g. a phase interpolator to adjust the phase of clock signal EqCk with respect to the edge clock signals eCkE and eCkO. The clock signals here and elsewhere can be single-ended or differential. A common-mode voltage for signal Veq can be established using a voltage generator 2506 that receives a common-mode reference voltage Vcomref. Voltage generator 2506 prevents changes in the correction factors from impacting the common-mode voltage at output port Veq.

The clock signal from delay line 2505 times the application of feedback from respective odd and even data pipes 2515 and 2520 to DACs 2502 such that the resulting feedback pulses are aligned to the incoming data symbols from the preceding linear equalizer. A pair of AND gates gate the odd and even clock signals eCkO and eCkE so that filter 2500 can be disabled in a low-power mode (when signal LP is asserted). Though signal LP may be the same signal asserted to drive the associated DFE into a low-power mode, or the FIR filter and DFE may be controlled separately to provide more power settings. Still greater flexibility can be achieved by selective control of each or a subset of the taps.

Figure 26:
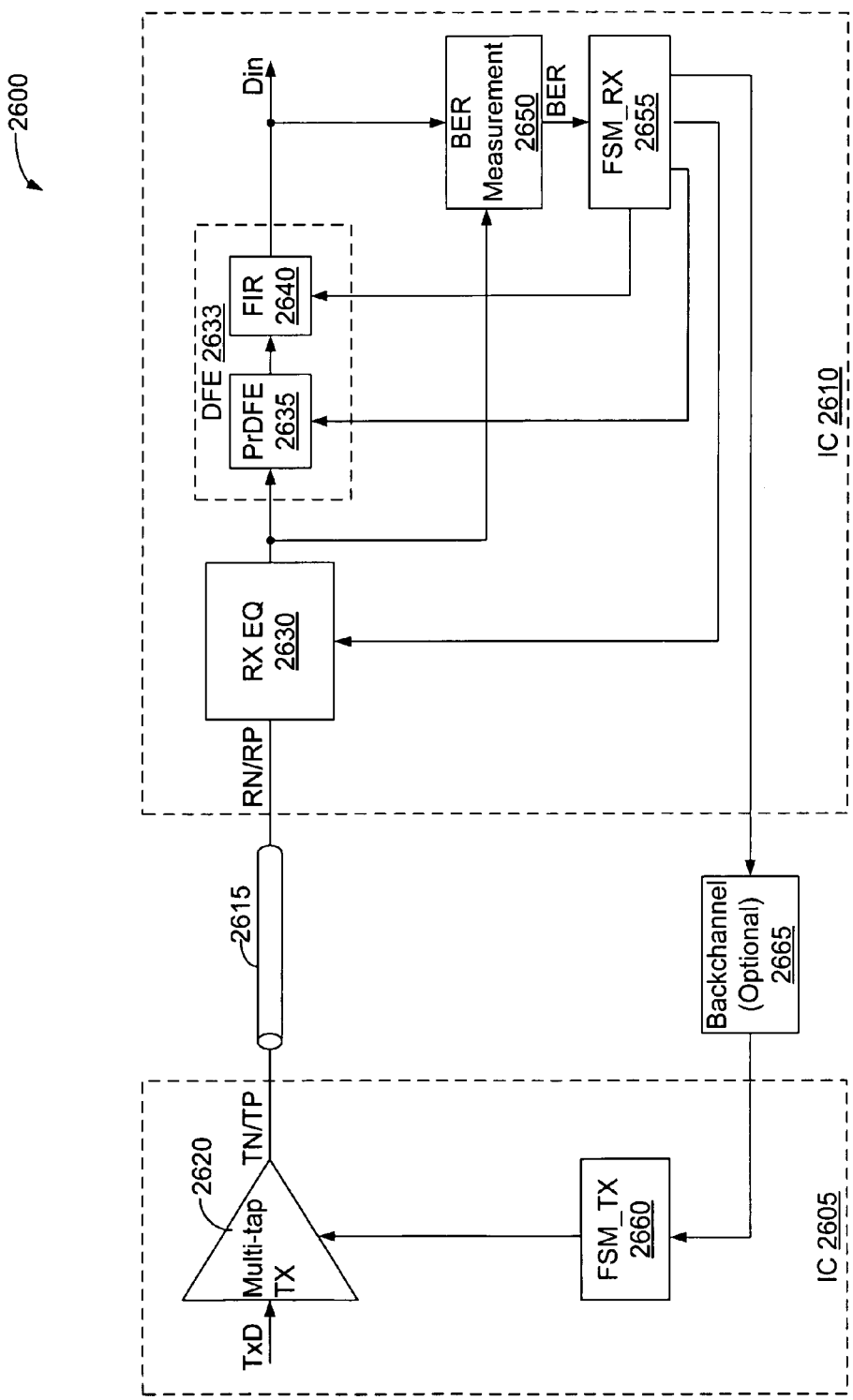
FIG. 26 depicts an adaptive communication system 2600 in accordance with one embodiment.

FIG. 26 depicts an adaptive communication system 2600 in accordance with one embodiment. System 2600 includes a transmitter 2605 that transmits a differential data signal TN/TP to the input port of a receiver 2610 via a differential channel 2615. Transmitter 2605 includes a multi-tap transmitter 2620 with pre-emphasis, which is in one embodiment similar to transmitter 300 of FIG. 3. Receiver 2610 includes a linear equalizer 2630 and a DFE 2633, which in turn includes e.g. a PrDFE 2635 and an FIR 2640. Detailed discussions of suitable transmitter and receiver components are presented above, so detailed treatments of transmitter 2605, receive equalizer 2630, and DFE 2633 are omitted here for brevity.

In addition to components of the type discussed above, IC 2610 includes an error-measurement circuit 2650 that compares input data Din with some reference to determine the bit error rate (BER). A finite state machine (FSM) 2655 receives a measure of the BER from measurement circuit 2650 and adjusts one or more of receive equalizer 2630, PrDFE 2635, and FIR 2640. FSM 2655 can also convey instructions to a corresponding transmitter FSM 2660, e.g. via a backchannel 2665, to adaptively change the setting of transmitter 2620. BER measurement circuit 2650 samples the output of receive equalizer 2630 and compares the result with the value sampled by PrDEF 2635.

Suitable measurement circuits are detailed U.S. patent application Ser. No. 09/976,170 filed Oct. 12, 2001, and entitled "Method and Apparatus for Evaluating and Optimizing a Signaling System," by Zerbe et al., which issued Nov. 14, 2006, as U.S. Pat. No. 7,137,048 and is incorporated herein by reference. BER is only one measure of signal quality: one or more other measures, such as voltage and timing margin, can be used instead of or in addition to BER. Some of these circuits use methods that are non-destructive to the main data signal path, e.g. margins can be measured while normal data is being transmitted. Backchannel 2665 can be implemented in a number of ways. In some embodiments, for example, backchannel 2665 communicates with IC 2605 via channel 2615, a configuration that reduces the requisite number of device pins and interconnections. Some such examples are detailed in U.S. patent application Ser. No. 10/739,823 entitled "Noise-Tolerant Signaling Schemes Supporting Simplified Timing And Data Recovery," by Andrew Ho, Vladimir Stojanovic, Fred F. Chen, Elad Alon, and Mark A. Horowitz, which issued Nov. 6, 2007, as U.S. Pat. No. 7,292,637 and is incorporated herein by reference.

Figure 29:
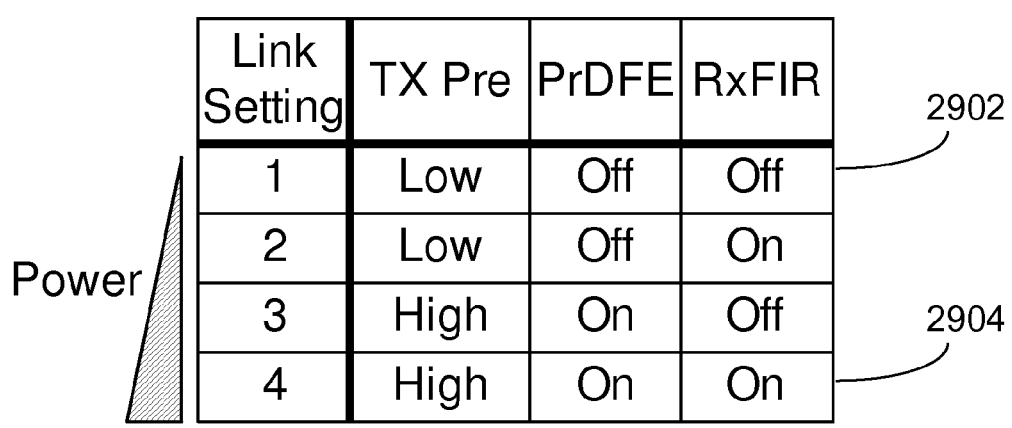
FIG. 29 is a table that illustrates possible equalizer settings and their possible relative power requirements.

In some embodiments, the receive FSM 2655 additionally controls power settings for one or more of transmitter 2620, equalizer 2630, PrDFE 2635, and FIR 2640. Furthermore, FSM 2655 might receive feedback relating the quality of a number of additional links, and may be configured to optimize the power and performance settings for a number of links to achieve an overall level of system performance. FIG. 29 shows a table that is illustrative of some of the possible equalizer settings and their possible relative power requirements.

Further referring to FIG. 29, in row 1, at 2902, representative of the lowest performance setting, the transmitter is in the low-performance mode and both the PrDFE and FIR of the corresponding receiver are disabled. In row 4, at 2904, representative of the highest performance setting, the transmitter is in the high-performance mode and both the PrDFE and FIR are enabled. The table of FIG. 29 is illustrative: other combinations of devices can be activated, and each of the adaptable elements in FIG. 26 can be configured over a range of settings. For example, the transmitter may change the weights associated with some taps or the FIRs of the transmitter or receiver can be modified to support modes in which individual or collections of taps can be disabled if not needed to consume minimum power while satisfying the performance or margin objective. Similarly the Rx Equalizer output swing and gain may be scaled back to the point where minimum performance margins are met, thus also reducing its power. Alternately some TX or DFE taps could be completely powered down if they are not needed and, if their clock is isolated, power can be saved from that section of the clock tree. Through a combination of enabling or disabling Tx and Rx DFE taps and adjustment of the tap positions the overall system power can be minimized while maintaining adequate margins. Further, the entire transmitter output swing, and thus the power consumed, can be adjusted and balanced against the equalization settings to minimize system power and crosstalk to adjacent links while maintaining margin to the required system bit error rate. Other combinations of settings may also be supported.

Figure 27:
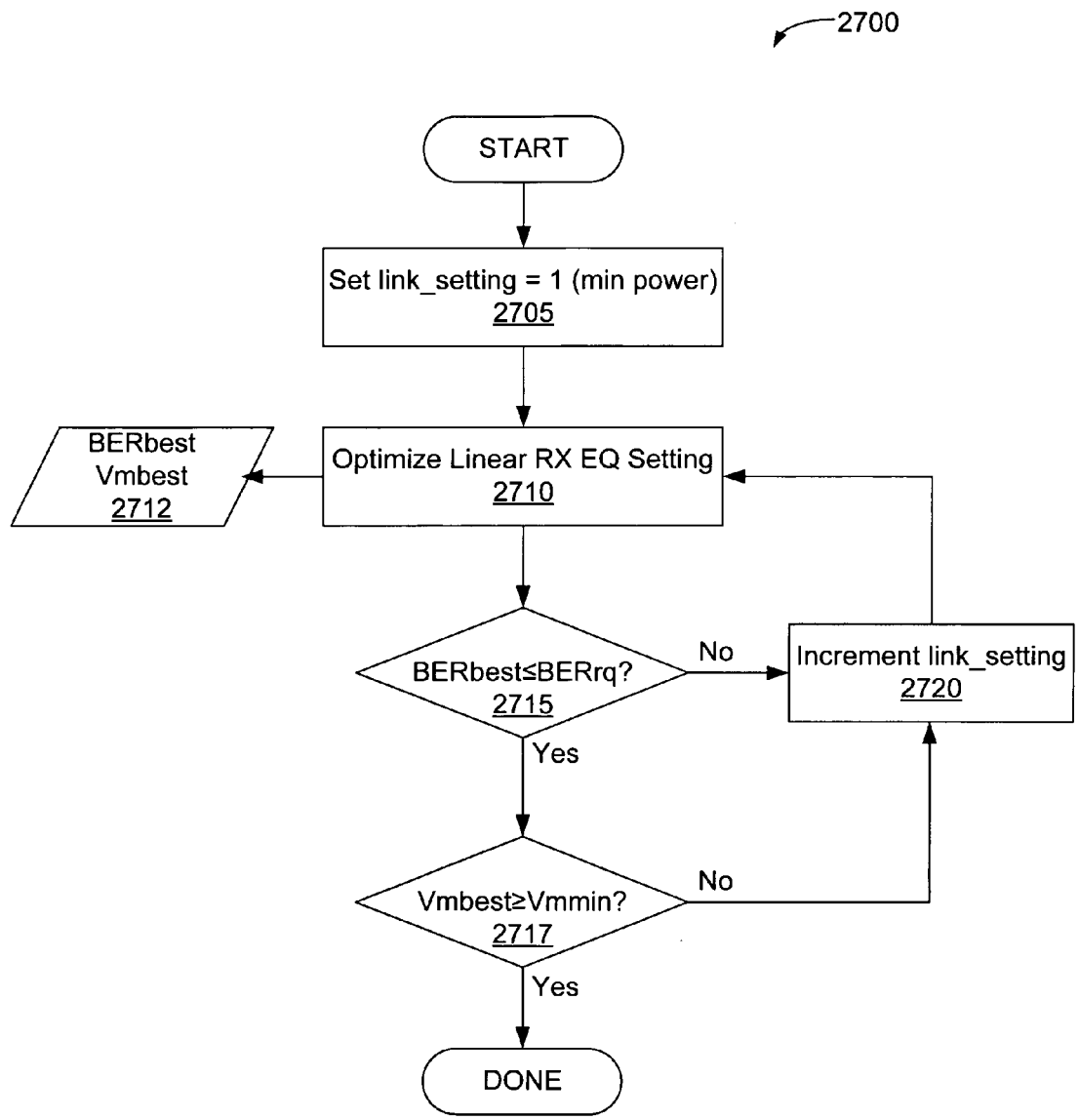
FIG. 27 is a flowchart 2700 depicting a method of finding a power setting for system 2600 of FIG. 26 that minimizes operating power in achieving a desired level of performance.

FIG. 27 is a flowchart 2700 depicting a method of finding a power setting for system 2600 of FIG. 26 that minimizes operating power in achieving a desired level of performance. Beginning with step 2705, the link setting is set to establish the lowest operating power (e.g., setting #1 in FIG. 29 at 2902). Next, the settings for the transmitter, linear receive equalizer, and DFE (e.g., 2620, 2630, and 2633 of FIG. 26) are optimized (step 2710) using e.g. a process described above. Step 2710 produces measurements of the best bit-error rate BERbest and best voltage margin Vmbest for the current link setting (data 2712). If the best bit-error rate BERbest is less than or equal to the required bit-error rate BERrq and the best voltage margin Vmbest is greater than or equal to the minimum voltage margin Vmmin (decisions 2715 and 2717), then the current link setting is saved and the process of FIG. 27 is finished. If either of decisions 2715 and 2717 yield a "no," indicating unacceptably low link performance, then the process moves to step 2720 and the next higher link setting is tried. The process of FIG. 27 can be applied to one or a collection of links, and may be repeated periodically for active links to adapt for changes in e.g. temperature, supply-voltage, and the system noise environment.

Figure 28:
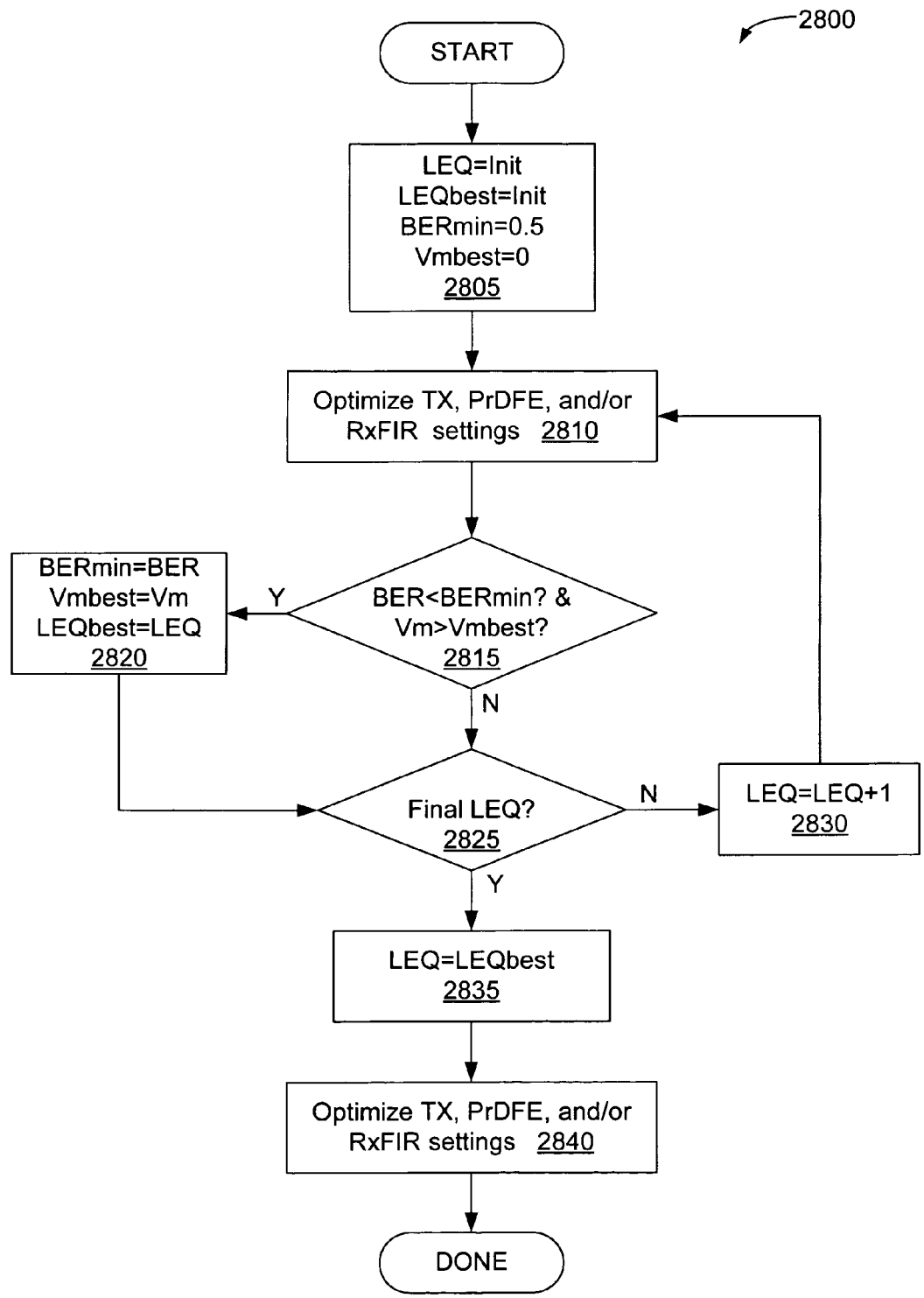
FIG. 28 is a flowchart 2800 depicting a method of optimizing linear receive equalizer settings in step 2710, of FIG. 27, in accordance with one embodiment.

FIG. 28 is a flowchart 2800 depicting a method of optimizing linear receive equalizer settings in step 2710, of FIG. 27, in accordance with one embodiment. First, at step 2805, variables used in optimizing the power settings are set to initial values. Signal LEQ, the setting of the linear equalizer, is initialized to e.g. zero. Three registers (not shown) are initialized to store the best LEQ setting LEQbest, an initial bit-error rate BERmin, and a best voltage margin Vmbest. The remainder of flowchart 2800 replaces these initial values with measured values of the best linear-equalizer setting, the lowest BER, and the highest voltage margin for the selected link setting.

In the next step, 2810, the settings of the transmitter, PrDFE, and/or the receive FIR are adaptively optimized for the selected link settings. Methods and circuits for performing these optimizations are detailed in e.g. the above-incorporated U.S. patent application Ser. No. 10/662,872 entitled "Partial Response Receiver," by Vladimir M. Stojanovic, Mark A. Horowitz, Jared L. Zerbe, Anthony Bessios, Andrew C. Ho, Jason Wei, Grace Tsang, and Bruno W. Garlepp.

Next, the BER and voltage margin are measured for the link under consideration (decision 2815). If the BER is less than the recorded minimum BERmin and the voltage margin Vm is greater than the recorded best voltage margin Vmbest, then BERmin, Vmbest, and LEQbest are updated with the current BER, voltage margin Vm, and LEQ setting (step 2820). Irrespective of whether the values of step 2820 are updated, the process moves to decision 2825. If all the LEQ settings have been tried, the linear equalizer setting LEQ is set to LEQbest (step 2835) and the system settings are once again optimized in the manner of step 2810 (step 2840); otherwise, the LEQ setting is incremented (step 2830) the process returns to step 2810. The process of flowchart 2800 thus provides, as outputs, the best LEQ setting for a given power setting and the associated BER (BERbest) and voltage margin (Vmbest) by use of an exhaustive search of the settings of the linear equalizer. Those skilled in the art can easily see an extension of the search techniques used to include those of a binary search or other techniques faster than exhaustive search.

In the foregoing description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Similarly, signals described or depicted as having active-high or active-low logic levels may have opposite logic levels in alternative embodiments. As another example, circuits described or depicted as including metal oxide semiconductor (MOS) transistors may alternatively be implemented using bipolar technology or any other technology in which a signal-controlled current flow may be achieved. With respect to terminology, a signal is said to be "asserted" when the signal is driven to a low or high logic state (or charged to a high logic state or discharged to a low logic state) to indicate a particular condition. Conversely, a signal is said to be "de-asserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or de-asserts, if explicitly stated or indicated by context) the signal on a signal line coupled between the signal driving and signal receiving circuits. A signal line is said to be "activated" when a signal is asserted on the signal line, and "deactivated" when the signal is deasserted. Whether a given signal is an active low or an active high will be evident to those of skill in the art.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can use such encoded data to fabricate integrated circuits comprising one or more of the circuits described herein.

While the present invention has been described in connection with specific embodiments, variations of these embodiments will be obvious to those of ordinary skill in the art. For example, the signal detectors described herein quickly identify data peaks by experimenting with a range of phase offsets. The correct phase offset, once known, can be shared with a CDR to aid in synchronizing a reference clock with the incoming data. Furthermore, the receivers described above employ voltage-mode signaling, but might also be adapted to employ current-mode schemes in which signals are conveyed as modulated currents. Voltage thresholds may also be employed in the latter case by simply converting current signals to voltage for comparison with a voltage reference. In addition, embodiments of the invention may be adapted for use with multi-pulse-amplitude-modulated (multi-PAM) signals, the number of stages of PrDFEs or of FIR filters can be adjusted in embodiments that employ them, and the invention is not limited to DDR, but could be employed in e.g. single-data-rate (SDR) or quad-data-rate (QDR) systems. Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. Section 112.

What is claimed is:

1. A system comprising:
   a transmitter having transmit pre-emphasis circuitry with a plurality of transmit filter taps;
   a receiver to receive a signal from the transmitter via a channel, the channel having a channel length, the receiver having a decision-feedback equalizer having at least one filter tap, the receiver further comprising a linear equalizer coupled between the channel and the decision-feedback equalizer and having at least one linear equalizer tap, the plurality of transmit filter taps further including an adjustable filter tap of an adjustable symbol latency, the adjustable filter tap having a precursor latency in a first equalization mode and a post-cursor latency in a second equalization mode, the system further comprising tap control logic coupled to the at least one linear equalizer tap and the adjustable filter tap of the transmit pre-emphasis circuitry; and
   where the system supports a training mode for link training operations and at least the first and second equalization modes for data transfer operations, including the first equalization mode where the transmit pre-emphasis circuitry and the decision-feedback equalizer are activated, and the second equalization mode where the transmit pre-emphasis circuitry is activated and the decision-feedback equalizer is deactivated, and where a selection between the first equalization mode and the second equalization mode is based on the channel length.

2. The system of claim 1, wherein the linear equalizer is disabled in the second equalization mode and enabled in the first equalization mode.

3. The system of claim 1, wherein the tap control logic is further coupled to the linear equalizer to selectively disable the linear equalizer.

4. The system of claim 1, wherein the transmit pre-emphasis circuitry further includes logic to set the adjustable filter tap to a first symbol latency relative to a main filter tap in the first equalization mode and to set the adjustable filter tap to a second symbol latency relative to the main filter tap in the second equalization mode.

5. The system of claim 1, the transmit pre-emphasis circuitry including a driver having a plurality of driver input terminals, the plurality of transmit filter taps coupled to respective ones of the driver input terminals and supporting first and second tap configurations, and mode circuitry to select the first tap configuration in the second equalization mode and the second tap configuration in the first equalization mode.

6. A system comprising:
   first and second transmitters, each transmitter having a plurality of transmit taps, including a pre-cursor transmit tap, a cursor transmit tap, and a post-cursor transmit tap, coupled to respective driver input terminals;
   first and second channels coupled to the respective first and second transmitters;
   first and second receivers coupled to the first and second transmitters via the respective first and second channels, the first and second receivers each having a plurality of receive taps, including a post-cursor receive tap; and
   tap-control logic coupled to the receive taps, the tap-control logic disabling at least one of the receive taps in the first receiver and enabling at least one of the receive taps in the second receiver;
   wherein the tap-control logic is coupled to the transmit taps;
   wherein the tap-control logic supports multiple power modes, including a low-power mode in which a first number of the receive taps is enabled and a high-power mode in which a second number, greater than the first number, of the receive taps is enabled; and
   wherein the first channel is in the low-power mode and the second channel is in the high-power mode.

7. The system of claim 6, wherein each of the first and second receivers includes a linear equalizer preceding the receive taps.

8. The system of claim 6, wherein each of the receivers includes an amplitude detector.

9. A signaling system supporting a plurality of modes, including a first mode and a second mode, the signaling system comprising:
   a. a communication channel;
   b. a transmitter that includes:
      a plurality of pre-emphasis taps, including a first transmit tap and a second transmit tap of an adjustable latency relative to the first transmit tap, and
      logic to alter the latency of the second transmit tap relative to the first transmit tap to select between the first mode and the second mode; and
   c. a receiver having a receive equalizer coupled to the transmitter via the communication channel, wherein the receive equalizer includes at least one post-cursor receive tap having a post-cursor latency in the first mode and disabled in the second mode, and wherein the second transmit tap has the post-cursor latency in the second mode.

10. The signaling system of claim 9, wherein the receiver includes a liner equalizer with adjustable gain disposed between the receive equalizer and the channel.

11. A signaling system supporting a plurality of power and performance modes, including a high-performance mode and a low-performance mode, the signaling system comprising:
   a. a communication channel;
   b. a first transmitter that includes:
      i. a transmit pre-emphasizer having a plurality of input terminals and an output port coupled to the communication channel;
      ii. a plurality of pre-emphasis taps coupled to respective ones of the plurality of input terminals, the pre-emphasis taps including a pre-cursor tap and a transmit post-cursor tap; and
      iii. a first mode-select port;
   c. a receiver coupled to the output port of the transmitter via the communication channel, the receiver including a decision-feedback equalizer having at least one filter tap, and a linear equalizer coupled between the communication channel and the decision-feedback equalizer and having at least one linear equalizer tap, the receiver further including a second mode-select port; and
   d. a controller coupled to the first and second mode-select ports;
   e. wherein the controller disables the transmit post-cursor tap and enables the receive post-cursor tap in the high-performance mode.

12. The signaling system of claim 11, further comprising:
   a. a second communication channel;
   b. a second transmitter that includes:
      i. a second transmit pre-emphasizer having a plurality of input terminals and an output port coupled to the communication channel;
      ii. a second plurality of pre-emphasis taps coupled to respective ones of the plurality of input terminals, the second plurality of pre-emphasis taps including a first transmit tap and a second transmit tap of an adjustable latency relative to the first transmit tap; and
      iii. a second mode-select port to receive a second mode-select signal, the second mode-select signal to alter the latency of the second transmit tap relative to the first transmit tap.

13. The signaling system of claim 12, wherein the controller is to control the second transmit tap in at least one of the first and second transmitters to alternatively precede or follow the first transmit tap in the respective one of the first and second transmitters.

14. The signaling system of claim 13, wherein the controller independently selects between the high-performance mode and the low-performance modes for each of the first and second transmitters.

15. The signaling system of claim 14, further comprising at least one performance monitor coupled to an output of the receiver, the performance monitor to convey to the controller an error rate for the communication channel.

16. The signaling system of claim 15, wherein the controller selects between the high-performance mode or the low-performance mode for the communication channel based, at least in part, upon the error rate.

17. The signaling system of claim 16, wherein the controller selects, for the communication channel, the high-performance mode if the error rate is above an error threshold.

18. The signaling system of claim 17, wherein the controller selects, for the second communication channel, the high-performance mode if a second error rate is above the error threshold.

19. A system comprising:
   a. a transmitter having transmit pre-emphasis circuitry with a plurality of transmit filter taps;
   b. a channel coupled to the transmit pre-emphasis circuitry; and
   c. a receiver coupled to the transmit pre-emphasis circuitry via the channel, the receiver having a decision-feedback equalizer having one or more filter taps, the receiver further comprising a linear equalizer coupled between the channel and the decision-feedback equalizer and having at least one linear-equalizer tap, the plurality of transmit filter taps further including an adjustable filter tap of an adjustable symbol latency, the adjustable filter tap having a pre-cursor latency in a first equalization mode and a post-cursor latency in a second equalization mode, the system further comprising tap control logic coupled to the at least one tap of the linear equalizer and the adjustable filter tap of the transmit pre-emphasis circuitry;
      where the system supports at least the first and second equalization modes, where the first equalization mode comprises a high-performance mode where the decision-feedback equalizer is operated, and where the second equalization mode comprises a low-power mode where the transmit pre-emphasis circuitry is activated and the decision-feedback equalizer is deactivated; and
      wherein the transmit pre-emphasis circuitry is activated in each of the high-performance mode and the low-power mode.

20. The system of claim 19, where the receiver includes the decision-feedback equalizer with plural taps, at least one of the plural taps activated and de-activated in the high-performance mode and low-power mode respectively.

21. The system of claim 20, where at least one of the plural taps is activated in each of the high-performance mode and the low-power mode.

* * * * *